(12) United States Patent
Nakaya et al.

(10) Patent No.: US 7,661,760 B2
(45) Date of Patent: Feb. 16, 2010

(54) DEVICE FOR VEHICLE SEAT

(75) Inventors: Kouichi Nakaya, Hiroshima (JP); Kenji Muramatsu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 70 days.

(21) Appl. No.: 11/515,937

(22) Filed: Sep. 6, 2006

(65) Prior Publication Data
US 2007/0063567 A1 Mar. 22, 2007

(30) Foreign Application Priority Data
Sep. 20, 2005 (JP) ............................. 2005-272577
Sep. 20, 2005 (JP) ............................. 2005-272581
Sep. 20, 2005 (JP) ............................. 2005-272588

(51) Int. Cl.
*A47C 4/12* (2006.01)
(52) U.S. Cl. .................. 297/321; 297/341; 297/330; 297/378.12; 297/362.11
(58) Field of Classification Search ............ 297/362.11, 297/362, 364.13, 378.1, 353, 354.1, 331, 297/378.12
See application file for complete search history.

(56) References Cited

U.S. PATENT DOCUMENTS

| | | | | |
|---|---|---|---|---|
| 4,647,801 A * | 3/1987 | Swartwout | .................... | 310/41 |
| 5,099,193 A * | 3/1992 | Moseley et al. | ............. | 323/324 |
| 5,203,600 A * | 4/1993 | Watanabe et al. | .......... | 296/68.1 |
| 5,483,853 A * | 1/1996 | Moradell et al. | ....... | 74/665 GD |
| 5,570,931 A * | 11/1996 | Kargilis et al. | ......... | 297/378.12 |
| 5,664,838 A * | 9/1997 | Baloche | ................. | 297/378.12 |
| 5,702,155 A * | 12/1997 | Ito | ......................... | 297/362.11 |
| 5,765,840 A * | 6/1998 | Tame | ......................... | 297/330 |
| 6,042,145 A * | 3/2000 | Mitschelen et al. | ......... | 280/735 |
| 6,126,132 A * | 10/2000 | Maue | ......................... | 248/429 |
| 6,131,999 A * | 10/2000 | Piekny et al. | .......... | 297/378.12 |
| 6,193,316 B1 * | 2/2001 | Janke et al. | ............ | 297/362.11 |
| 6,193,317 B1 * | 2/2001 | Mitschelen et al. | ...... | 297/378.1 |
| 6,428,104 B1 * | 8/2002 | Sakamoto et al. | ....... | 297/362.11 |
| 6,641,499 B1 * | 11/2003 | Willmot | ..................... | 475/172 |
| 6,663,179 B2 * | 12/2003 | Sunohara | ................. | 297/378.1 |
| 6,709,040 B1 * | 3/2004 | Drew et al. | .................... | 296/66 |
| 6,793,265 B2 * | 9/2004 | Kamida et al. | ................ | 296/64 |
| 7,118,178 B2 * | 10/2006 | Daniels | .................... | 297/378.1 |
| 7,134,725 B2 * | 11/2006 | Hofmann et al. | ......... | 297/378.1 |
| 7,192,089 B2 * | 3/2007 | Boudinot | ............... | 297/362.11 |
| 7,328,939 B2 * | 2/2008 | Moriyama et al. | ............ | 297/15 |
| 2002/0011748 A1 * | 1/2002 | Ito et al. | ..................... | 297/362 |
| 2002/0113478 A1 * | 8/2002 | Kasahara | ............... | 297/362.11 |
| 2002/0140267 A1 * | 10/2002 | Ikegaya et al. | .............. | 297/362 |

(Continued)

FOREIGN PATENT DOCUMENTS

JP 2001-239870 9/2001

(Continued)

*Primary Examiner*—David Dunn
*Assistant Examiner*—James Alex

(57) ABSTRACT

When a seat back in a forwardly folded state is raised to a predetermined raised state by activating an electric motor by turning on a switch, the electric motor is immediately stopped even if the switch is still turned on, and the seat back is retained in the raised state. There are provided a locking member which operates to retain the seat back in the raised state when the seat back is in the predetermined raised state and a lever which turns in association with the operation of the locking member. The lever turns on another switch to open a drive circuit for the electric motor.

19 Claims, 11 Drawing Sheets

U.S. PATENT DOCUMENTS

| | | | |
|---|---|---|---|
| 2003/0080599 A1* | 5/2003 | Hohn et al. | 297/362 |
| 2004/0135417 A1* | 7/2004 | Macey | 297/378.1 |
| 2004/0195889 A1* | 10/2004 | Secord | 297/362 |
| 2004/0195892 A1* | 10/2004 | Daniels | 297/378.1 |
| 2004/0251727 A1* | 12/2004 | Beneker et al. | 297/362 |
| 2005/0052064 A1* | 3/2005 | Bruck et al. | 297/369 |
| 2005/0236881 A1* | 10/2005 | Suda et al. | 297/378.1 |
| 2005/0264077 A1* | 12/2005 | Becker et al. | 297/378.1 |

FOREIGN PATENT DOCUMENTS

| | | |
|---|---|---|
| JP | 2004-249962 | 9/2004 |
| JP | 2005-041406 | 2/2005 |

* cited by examiner

DEVICE FOR VEHICLE SEAT

CROSS REFERENCE TO RELATED APPLICATIONS

This Non-provisional application claims priority under 35 U.S.C. § 119(a) on Patent Application Nos. 2005-272577, 2005-272581, and 2005-272588, each filed in Japan on Sep. 20, 2005, the entire contents of which are hereby incorporated by reference.

BACKGROUND OF THE INVENTION

1. Field of the Invention

The present invention relates to a device for a vehicle sheet.

2. Background Art

In a cabin structure of a vehicle, such as an automobile or the like, it is generally known as disclosed in Japanese Patent Application Laid Open Publication No. 2001-239870A to divide the cabin into a passenger compartment and a luggage compartment at the back of the cabin by a sheet back of the rearmost seat of a plurality of seats arranged back and forth and to fold the seat back forward so as to be laid over a seat cushion for using the upwardly facing back of the seat back as a luggage table, namely, so as to expand the luggage space toward a passenger compartment.

Referring to generally known vehicle seats, Japanese Patent Application Laid Open Publication No. 2005-41406A proposes that laying of a seat back over the seat cushion and returning thereof to a raised state are performed by an electric motor. In this proposal, a limit switch detects completion of the laying of the seat back thereover or completion of development (raising) and, then, stops the electric motor. It is further known as disclosed in Japanese Patent Application Laid Open Publication No. 2004-249962A that the sheet is stored in a storage wholly section behind the seat with the seat back laid over the seat cushion, that the storage and returning to the original state thereof are performed by the electric motor, and that a manipulation switch which returns to an OFF state upon release of manipulation therefore is arranged at the rear of the seat (in a luggage compartment).

The electric motor employed for raising the seat back from the forwardly folded state as above mitigates burden on the user. In employing the electric motor, it can be contemplated to arrange a momentary type manipulation switch at the luggage compartment or the like at the rear of the seat so as to operate the electric motor only when the manipulation switch is pushed.

Employment of such a momentary type manipulation switch, however, delegates the user to determine the posture of the seat back. Accordingly, even if the user determines the raised angle of the seat back at a degree that the user thinks it comfortable and stops the electric motor to set the seat back at the determined angle, expected comfortableness would not be obtained in some cases. For example, the seat back is raised excessively to cause the user to feel uncomfortable or is reclined so backward to cause the user to feel uncomfortable and to narrow the luggage space behind the seat back.

For tackling this problem, a mark that indicates a position of the seat back which brings the seat back to a predetermined position may be provided. In this case, the user can turn off the manipulation switch while confirming the raised position of the seat back by watching the mark. Even in such a case, however, the user may release his/her hand too early or too late, which invites impossibility to stop the seat back at the desired raised position without failure.

Alternatively, a stopper may be provided for stopping the seat back at a predetermined raised position. Specifically, the seat back is raised by the operation of the electric motor, and overcurrent flows in the electric motor upon abutment of the seat back on the stopper. When the overcurrent is detected, electric conduction to the electric motor is cut. In this case, however, large force is applied to the seat back, the stopper, and the like until the electric motor is stopped from the time when the seat back abuts on the stopper, and therefore, the device for the seat vehicle is liable to be broken. For tackling this problem, a part of the stopper or the seat back may be reinforced. This reinforcement, however, involves an increase in weight of the vehicle.

Another device may be considered. Namely, the electric motor is used not only for raising the seat back from the forwardly folded state but also for folding the seat back forward from the raised state. In this device, the seat back would be folded forward by careless operation of the electric motor though an object would be placed on the seat. Further, it is necessary for folding the seat back forward to manipulate an activation switch for the electric motor. Further, it takes considerable time from the time when the activation switch is turned on to the time when the electric motor is activated, the seat back is folded forward, and then, the electric motor is stopped. Therefore, quick forwardly folding of the seat back cannot be attained. Further, employment of the electric motor for forwardly folding the seat back increases power consumption in the automobile.

To tackle this problem, a scheme can be considered in which the seat back is raised by the electric motor and is folded forward by biasing means, such as a spring or the like, so that seat back becomes in the forwardly folded state immediately upon manual lock release of the seat back.

However, the electric motor for raising the seat back restrains forwardly folding of the seat back because the electric motor engages with the seat back or the vehicle (or the seat cushion) through transmitting means, such as a gear. In detail, in order to fold the seat back forward, the output shaft of the electric motor must be rotated in a direction reverse to that for raising the seat back, and therefore, the electric motor restrains forwardly folding thereof. For this reason, only by the biasing means, the seat back may stop being folded forward in the middle, so that the seat back may not be in the predetermined forwardly folded state unless the user pushes the seat back from above. Further, the base end of the seat back may be rubbed with the rear end of the seat cushion in forwardly folding of the seat back, to cause friction resistance in forwardly folding of the seat back. In this case, not only restraint of the electric motor but also the friction resistance applied cause difficulty in setting the seat back to the predetermined forwardly folded state only by the biasing means, such as a spring or the like.

SUMMARY OF THE INVENTION

For tackling the above problems, the present invention has its object of enabling a manipulation for raising a seat back with safety confirmed and enabling setting of the seat back in an appropriate raised state.

Another object of the present invention is to attain safety and user-friendly manipulation for folding or raising the seat back in a device for a vehicle seat including an electric motor for raising the seat back.

In order to enhance operability and safety of a seat back raising operation, the present invention employs an electric motor for raising the seat back and a combination of a momentary manipulation switch and a mechanism for compulsorily stopping raising motion of the seat back. In one preferable embodiment, forwardly folding of the seat back is carried out manually, and the electric motor is prevented from restraining forwardly folding thereof.

A first invention of the present invention provides a device for a vehicle seat that includes a seat cushion and a seat back that turns around a part in the vicinity of a rear end of the seat cushion so as to be changeable between a predetermined raised state and a forwardly folded state where it is inclined and folded toward the seat cushion or it is laid over the seat cushion and that is arranged adjacently to and on a vehicle front side of a luggage compartment including:

an electric motor for turning the seat back around the part in the vicinity of the rear end of the seat cushion; and a drive circuit for activating the electric motor, wherein the drive circuit includes:

a momentary type manipulation switch which is arranged at a predetermined part of a vehicle apart from the vehicle seat, which is set in an OFF state normally, and which activates, when manipulated to be in an ON state, the electric motor so that the seat back is raised from the forwardly folded state; and a compulsory cutting mechanism for cutting, when the seat back is raised to the predetermined raised state by manipulation of turning the manipulation switch to the ON state, electric conduction by the drive circuit to the electric motor so that the seat back is stopped in the predetermined raised state regardless of whether the manipulation of turning the manipulation switch to the ON state is continued.

With the above arrangement, for raising the seat back from the forwardly folded state, the user is required only to turn on the momentary type manipulation switch provided apart from the vehicle seat. Thus, the user can raise the seat back from the forwardly folded state while confirming safety with no special effort required. The user only puts off his/her hand from the manipulation switch when an object is ready to be caught between the seat back and the vehicle sidewall or when a baggage in the luggage compartment is ready to fall upon abutment thereof on the seat back in the middle of the raising of the seat back by the electric motor. This turns off the manipulation switch immediately to stop the electric motor, so that the seat back stops in the middle of its raising motion, causing no troubles.

When the seat back is raised and is in the predetermined raised state by pushing the manipulation switch for raising the seat back with safety confirmed, the compulsory cutting mechanism cuts the electric conduction by the drive circuit to the electric motor even if the ON state of the manipulation switch is continued still. Whereby, no torque is output from the electric motor, so that the seat back stops at the predetermined raised position. Accordingly, the seat back is prevented from being in a state more raised than the predetermined raised state or in a state reclined too rearward, preventing poor ride comfort. Further, the baggage accommodating space behind the seat back is prevented from being excessively narrowed. In addition, the vehicle seat is prevented from being damaged by torque of the electric motor.

Referring to a second invention, in the first invention, the seat back is changeable to a backwardly reclined state where the seat back is reclined or falls more backward than that in the predetermined raised state.

Referring to a third invention, in the second invention, the device for the vehicle seat further includes:

a first engaging member provided at the seat back;

a second engaging member provided at the seat cushion or a vehicle for retaining posture of the seat back by engaging with the first engaging member; and engaging/releasing mechanism which is in a first state that allows the first engaging member to engage with the second engaging member when the seat back is in the predetermined raised state or the backwardly reclined state and which is in a second state that releases the engagement of the first engaging member with the second engaging member when the seat back is in the forwardly folded state, wherein the compulsory cutting mechanism serves as an interlocking switch that works in association with operation of the engaging/releasing mechanism so as to be in an OFF state for cutting electric conduction by the drive circuit to the electric motor when the engaging/releasing mechanism is in the first state and so as to be in an ON state for allowing the electric conduction by the drive circuit to the electric motor when the engaging/releasing mechanism is in the second state.

With the above arrangements, when the engaging/releasing mechanism is in the second state where the engagement of the first engaging member with the second engaging member is released, the seat back can be raised. In the second state, the interlocking switch is in the ON state to allow electric conduction by the drive circuit to the electric motor. Accordingly, the seat back in the forwardly folded state can be raised by activating the electric motor by manipulating the manipulation switch. Hence, similarly to the first invention, the user can raise the seat back in the forwardly folded state only by pushing the manipulation switch while confirming safety with no special effort required.

When the seat back becomes in the predetermined raised state from the forwardly folded state, the engaging/releasing mechanism becomes in the first state where the first engaging member engages with the second engaging member, to turn the interlocking switch to be in the OFF state, thereby cutting the electric conduction by the drive circuit to the electric motor. Accordingly, the electric conduction is cut even if the manipulation of the manipulation switch is continued, preventing the electric motor from outputting torque. Further, the engagement of the first engaging member with the second engaging member securely retains the seat back in the predetermined raised state. Hence, similarly to the first invention, the seat back is prevented from being in a state more raised than the predetermined raised state or in a state reclined too backward.

Referring to a fourth invention, in the third invention, the engaging/releasing mechanism includes:

an operation member which moves between an operation point where it is in contact with one of the first and second engaging members to allow the one engaging member to engage with the other engaging member and a release point where the engagement is released;

a biasing member for applying force to the operation member to allow the operation member to move to the operation point; and release manipulation member, which is provided apart from the operation member and is connected to the operation member through operation force transmission member for moving the operation member to the release point against the force of the biasing member so as to release the engagement of the first engaging member with the second engaging member, wherein when the operation member moves to the operation point, the interlocking switch is in an OFF state by the movement thereof, and the interlocking switch is in an ON state when the operation member moves to the releasing point.

With the above arrangement, movement of the operation member between the operation point and the release point are directly reflected to engagement or release of the first engaging member with or from the second engaging member. In response to the movement of the operation member, the interlocking switch turns the electric conduction state of the electric motor between the OFF state and the ON state.

In turn, it can be said that engagement or release of the first engaging member with or from the second engaging member is directly reflected to ON/OFF of the interlocking switch. At the same time when the seat back becomes in the predetermined raised state by the manipulation of the manipulation switch and the first engaging member engages with the second engaging member so that the seat back is retained at the raised state, the interlocking switch is turned off reliably to cut the electric conduction to the electric motor. Thus, the deficiency that the electric motor is still being operated even after the seat back is retained in the predetermined raised state can be prevented, resulting in prevention of excessive load application to the device for the vehicle seat. Further, the deficiencies that the seat back cannot be in the predetermined raised state because of stop of the electric motor before the seat back is retained in the predetermined raised state and that the seat back cannot be retained securely by the engaging members can be prevented.

Referring to a fifth invention, in the fourth invention, the first engaging member is provided coaxially with a turning center of the seat back so as to turn together with the seat back, the operation member is in contact with the second engaging member, and turning of the first engaging member together with the seat back selectively changes an engaging point of the second engaging member relative to the first engaging member to change a backward reclined angle of the seat back.

With the above arrangement, when the operation member is moved to the release point by manipulating the release manipulation member, the engagement of the first engaging member with the second engaging member is released, enabling turning of the seat back in back and forth directions. When the manipulation of the release manipulation member is stopped, the operation member is moved to the operation point by the force of the biasing member to cause the engaging members to engage with each other. Accordingly, the backwardly reclined angle of the seat back can be changed by changing the position of the second engaging member relative to the first engaging member. The operation member for turning on/off the interlocking switch composes a seat back reclining mechanism in combination with the engaging members. According to this invention, the electric conduction to the electric motor can be controlled by the reclining mechanism, simplifying the constitution of the device for the vehicle seat.

Referring to a sixth invention, in the second invention, the device further includes:

a biasing member for applying force to turn the seat back in a direction where the seat back becomes in the forwardly folded state;

a retention mechanism for retaining the seat back in the predetermined raised state; and a manipulation member which releases the seat back retained by the retention mechanism for allowing the seat back to be in the forwardly folded state by the force of the biasing member, wherein the electric motor is provided at one of members of the seat cushion or the vehicle as a member and the seat back as a member for turning and raising the seat back with the part in the vicinity of the rear end of the seat cushion as the center by transmitting torque to the other member, and a transmission releasing mechanism is provided for inhibiting transmission of counter torque from the seat back to the electric motor when the seat back is folded to be in the forwardly folded state.

With the above arrangement, change of the seat back from the forwardly folded state to the raised state can be performed by the electric motor provided at one of members of the seat cushion or the vehicle as a member and the seat back as a member, mitigating burden on the user. When the manipulation member releases the seat back in the raised state retained by the retention mechanism, the seat back turns forward by force of the biasing member. The transmission releasing mechanism prevents counter torque from being transmitted from the seat back to the electric motor, so that the electric motor is prevented from restraining forwardly folding of the seat back. In other words, it is not required for forwardly folding of the seat back to rotate the output shaft of the electric motor in a direction reverse to rotation thereof for raising the seat back. Thus, the seat back can be set in a desired forwardly folded state only by the force of the biasing member or by adding user's power to the force of the biasing member.

Referring to a seventh invention, in the sixth invention, the device further includes:

a drive gear provided at the one member and rotated by an output shaft of the electric motor;

a driven gear provided rotatably and coaxially with a turning center of the seat back and meshing with the drive gear; and a clutch provided at the other member for inhibiting relative rotation of the driven gear with respect to the other member so that the seat back is raised by rotation of the drive gear by the electric motor, wherein the transmission releasing mechanism releases the driven gear from the clutch's rotation inhibition.

With the above arrangement, when the electric motor is driven with the clutch inhibiting the relative rotation of the driven gear, the driven gear receives the torque of the electric motor through the drive gear (in other words the torque is transmitted to the driven gear), thereby raising the seat back.

When the transmission releasing mean releases the clutch's rotation inhibition for folding the seat back forward, the driven gear plays and rotates relative to the other member (becomes rotatable). Whereby, the electric motor is prevented from restraining forwardly folding of the seat back.

The case where the one member at which the electric motor and the drive gear are provided is the seat back and the other member is the seat cushion or the vehicle results in the following. First, release of the clutch allows the driven gear to be rotatable relative to the seat cushion or the vehicle as the other member. Accordingly, in forwardly folding of the seat back, the driven gear is not rotated relative to the seat back and turns integrally with the seat back in the direction where the seat back is folded forward. In consequence, it is not required to rotate the drive gear engaging with the driven gear for folding the seat back forward, thereby preventing the electric motor from restraining forwardly folding of the seat back.

In contrast, the case where the one member at which the electric motor and the drive gear are provided is the seat cushion or the vehicle and the other member is the seat back results in the following. First, release of the clutch allows the driven gear to be rotatable relative to the seat back as the other member. In forwardly folding of the seat back, the seat back is rotated relative to the driven gear. In detail, in forwardly folding of the seat back, the driven gear is not rotated, and accordingly, the drive gear engaging with the driven gear is not rotated, thereby preventing the electric motor from restraining forwardly folding of the seat back.

Referring to an eighth invention, in the seventh invention, the clutch includes an engaging gear which rotates integrally with the driven gear, a hooking member which engages with the engaging gear, and a biasing member for applying force in a direction where the hooking member engages with the engaging gear, and a plurality of engaging teeth for engaging with the hooking member so as to allow the hooking member to inhibit the relative rotation of the driven gear are formed in the engaging gear in a peripheral direction of the engaging gear at a pitch larger than a forwardly foldable angle range of the seat back from an angle at the predetermined raised state to an angle at the forwardly folded state where it is inclined and folded toward the seat cushion.

With the above arrangement, when the seat back is folded forward by releasing the engagement of the hooking member with the engaging gear, the hooking member is prevented from engaging with one of the engaging teeth until the seat back is in the predetermined forwardly folded state even though force of the biasing member is applied to the hooking member in an engaging direction. Thus, the electric motor is prevented from restraining forwardly folding of the seat back, which is advantageous.

Referring to a ninth invention, in the eighth invention, cam face in contact with the hooking member is formed between engaging teeth adjacent to each other in the peripheral direction of the engaging gear, the cam face causing the relative rotation of the driven gear with respect to the other member upon receipt of force of the biasing member.

As described above, when the seat back is folded forward by releasing the engagement of the hooking member with the engaging gear, the hooking member is prevented from engaging with one of the engaging teeth until the seat back is in the predetermined forwardly folded state even though force of the biasing member is applied to the hooking member in the engaging direction. The hooking member, however, is in contact with the engaging gear by force of the biasing member, and therefore, friction force caused due to the contact restricts play of the driven gear. Accordingly, force for rotating the drive gear is generated by forwardly folding of the seat back to allow restraint by the electric motor. This is disadvantageous to forwardly folding of the seat back.

Under the circumstances, in this invention, cam faces with which the hooking member is in contact by the force of the biasing member are formed between the engaging teeth adjacent to each other in the peripheral direction of the engaging gear so that the driven gear is positively rotated relative to the other member by utilizing the force of the biasing member. Hence, force that rotates the drive gear in forwardly folding of the seat back is prevented from being generated, attaining smooth forwardly folding of the seat back.

Referring to a tenth invention, in the sixth invention, the transmission releasing mechanism works in association with releasing manipulation of the manipulation member for releasing the seat back retained by the retention mechanism so as not to transmit counter torque from the seat back to the electric motor.

With the above arrangement, when the retention mechanism releases the seat back for folding the seat back forward, the transmission releasing mechanism works concurrently so that counter torque is not transmitted from the seat back to the electric motor. Accordingly, no additional manipulation for transmission release is necessary, facilitating the manipulation for folding the seat back forward.

Referring to an eleventh invention, in the sixth invention, the seat cushion is connected to the seat back and is supported upwardly and downwardly movably to the vehicle so as to be lowered in association with forward folding of the seat back and so as to be raised in association with raising of the seat back.

In the case where the seat cushion is so arranged to be lowered in association with folding forward of the seat back, lowering of the seat cushion causes sliding resistance between the seat and a seat cushion of an adjacent seat, sliding resistance against the adjacent vehicle sidewall, and sliding resistance against the joined seat back, with a result that large force for folding the seat back forward is required. Even in such a case, however, this invention prevents the electric motor from restraining forwardly folding of the seat back. Thus, smooth folding forward of the seat back can be attained.

Referring to a twelfth invention, in the first invention, the vehicle further includes:

a biasing member for applying force to turn the seat back in a direction where the seat back is in the forwardly forded state;

a retention mechanism for retaining the seat back in the raised state; and a manipulation member for releasing the seat back retained by the retention mechanism, wherein the electric motor is provided at one of members of the seat cushion or the vehicle as a member and the seat back as a member for turning and raising the seat back with the part in the vicinity of the rear end of the seat cushion as the center by transmitting torque to the other member until the seat back in the forwardly folded state is in the predetermined raised state.

With the above arrangement, the seat back is folded forward by the force of the biasing member rather than by the electric motor. Therefore, even when the seat back forwardly folding operation is performed (the operation member releases retention of the retention mechanism) under a situation where an object is placed on the seat, large force is not applied to the object. In contrast, when the seat back is folded forward by the electric motor, the driving force of the electric motor works on the object even after the object is caught between the seat cushion and the seat back. In this invention, however, such a disadvantage can be obviated. It is possible to stop the electric motor upon detection of overcurrent of the electric motor, but such a countermeasure requires additional provision of an overcurrent detecting mechanism. In contrast, this invention attains simplification when compared with the countermeasure.

Since the seat back is raised from the forwardly folding state by the electric motor, burden on a passenger is mitigated. Also, since the manipulation switch for raising the seat back is provided at a predetermined part of the vehicle apart from the seat, a passenger is not required for raising the seat back to move to the seat back and can perform manipulation for raising the seat back in parallel to another work. For example, with the manipulation switch provided in the luggage compartment, a passenger can raise the seat back as needed while performing loading or unloading.

Referring to a thirteenth invention, in the twelfth invention, when the retention mechanism releases the seat back, the seat back becomes capable of being reclined or falling more backward than the predetermined raised state by being pushed against the force of the biasing member, and the retention mechanism retains the seat back in a backwardly reclined state as well as the seat back in the predetermined raised state.

In the case where the electric motor is used for raising the seat back as described above, it may be contemplated to use the electric motor for developing (reclining) the seat back backward, as well. It is desirable to raise the seat back as quickly as possible, and accordingly, the speed of backwardly reclining of the seat back by the electric motor may increase as well, inviting difficulty in precise adjustment of the backward reclined angle. Under the circumstances, this invention is arranged so that the seat back can be reclined by passenger's backward pushing thereof after release of the seat back retained by the retention mechanism and that the retention mechanism is capable of retaining the seat back at an appropriate backward reclined angle thereof. In short, the reclined angle can be adjusted manually by a passenger.

Referring to a fourteenth invention, in the thirteenth invention, the forwardly folded state is a state where the seat back is laid over the seat cushion, and the electric motor is set so that time required for changing the seat back from the forwardly folded state where it is laid over the seat cushion to the predetermined raised state is within seven seconds.

Accordingly, quick raising of the seat back from the forwardly folded state by the electric motor is enabled, and the reclined angle can be adjusted manually by a passenger in reclining the seat back backward.

Referring to a fifteenth invention, in the twelfth invention, the forwardly folded state is a state where the seat back is laid over the seat cushion, and the biasing member and the electric motor are set so that time required for changing the seat back from the predetermined raised state to the forwardly folded state where it is laid over the seat cushion is shorter than time required for changing the seat back from the forwardly folded state where it is laid over the seat cushion to the predetermined raised state.

Forwardly folding of the seat back by the biasing member improves safety when compared with a case by the electric motor. This invention takes this fact into consideration and sets the time required for forwardly folding the seat back to be shorter than the time required for raising it. Hence, the seat back can be folded forward quickly from the raised state and can be raised from the forwardly folded state with safety behind the seat back confirmed.

Referring to a sixteenth invention, in the second invention, the device further includes:

a biasing member for applying force to turn the seat back in a direction where the seat back is in the forwardly folded state; and a retention mechanism for retaining the seat back in the predetermined raised state and retaining the seat back in the backwardly reclined state, wherein the electric motor is provided at one of members of the seat cushion or the vehicle as a member and the seat back as a member for raising the seat back in the forwardly folded state to the predetermined raised state by transmitting torque to the other member, and when the retention mechanism releases the seat back in the predetermined raised state retained by the retention mechanism, the seat back becomes capable of being reclined or falling more backward than the predetermined raised state against the force of the biasing member.

With the above arrangement, the seat back can be raised quickly from the forwardly folded state to the raised state by the electric motor. Further, when the seat back retained by the retention mechanism is released after the seat back is raised and a passenger pushes the seat back backward, the seat back can be retained in a reclined state reclined at an appropriate angle by the retention mechanism. In other words, the reclined angle can be manually adjusted by a passenger.

Referring to a seventeenth invention, in the sixteenth invention, the device further includes:

a transmission control mechanism for controlling transmission of torque of the electric motor to the other member when the seat back is in the backwardly reclined state.

Accordingly, even if a passenger sitting on the seat mismanipulates the electric motor unintentionally, the torque of the electric motor is prevented from being transmitted to the other member when the seat back is in the reclined state. This prevents the seat back from being further reclined, reducing possibility of breaking a baggage placed in the luggage compartment and lessening passenger's uncomfortable feeling.

DESCRIPTION OF THE PREFERRED EMBODIMENT

An embodiment of the present invention will be described below with reference to the accompanying drawings.

Figure 1:
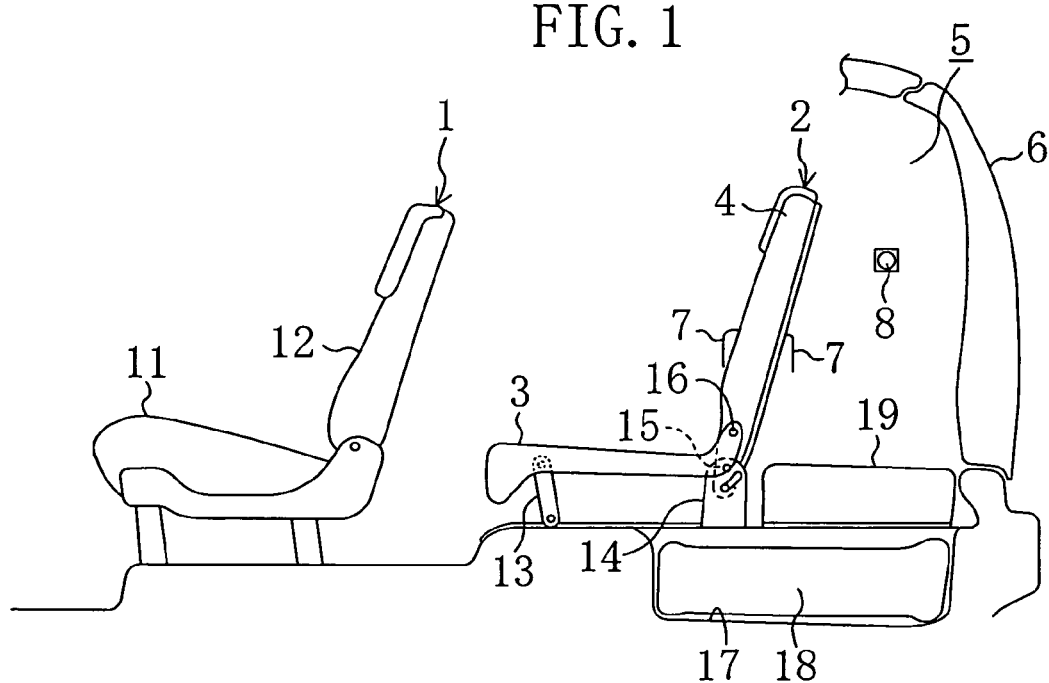
FIG. 1 is a side view showing a part of a vehicle rear part including a seat according to the present invention.

FIG. 1 shows a rear part of a vehicle (an automobile) including three rows of seats arranged in back and forth directions. In detail, FIG. 1 shows an intermediate seat 1 and a back seat 2, and a front seat including a driver's seat is not shown. In the state where a seat back 4 of the back seat 2 is raised, a luggage compartment 5 is formed behind the seat back 4. In other words, the raised seat back 4 partitions the vehicle cabin into a passenger compartment in the front part and the luggage compartment 5 in the rear part. A baggage can be loaded or unloaded from the back of the vehicle after a back door 6 at the back of the vehicle is opened. Further, a side door is provided on each side (outer side in a car width direction) of the intermediate seat 1, and a passenger can open the side door and get on or off the vehicle to sit on the intermediate seat 1 or the back seat 2.

The intermediate seat 1 includes a seat cushion 11 fixed to the floor and a seat back 12 provided at the rear end of the seat cushion 11 so as to be capable of being reclined.

The back seat 2 includes a seat cushion 3 and a seat back 4 as well, but is different in construction from the intermediate seat 1.

Specifically, the seat cushion 3 is supported at a front part thereof to the floor by means of a link 13 so as to be capable of moving up and down. Further, a lower end of the seat back 4 is connected by means of a pivot pin 15 to a bracket 14 fixed to the floor so as to be capable of turning. A rear end of the seat cushion 3 is connected to the lower end of seat back 4 by means of a pivot pin 16. The pivot pins 15, 16 and pivot pins at the respective ends of the link 13 are arranged horizontally in the car width direction.

Figure 2:
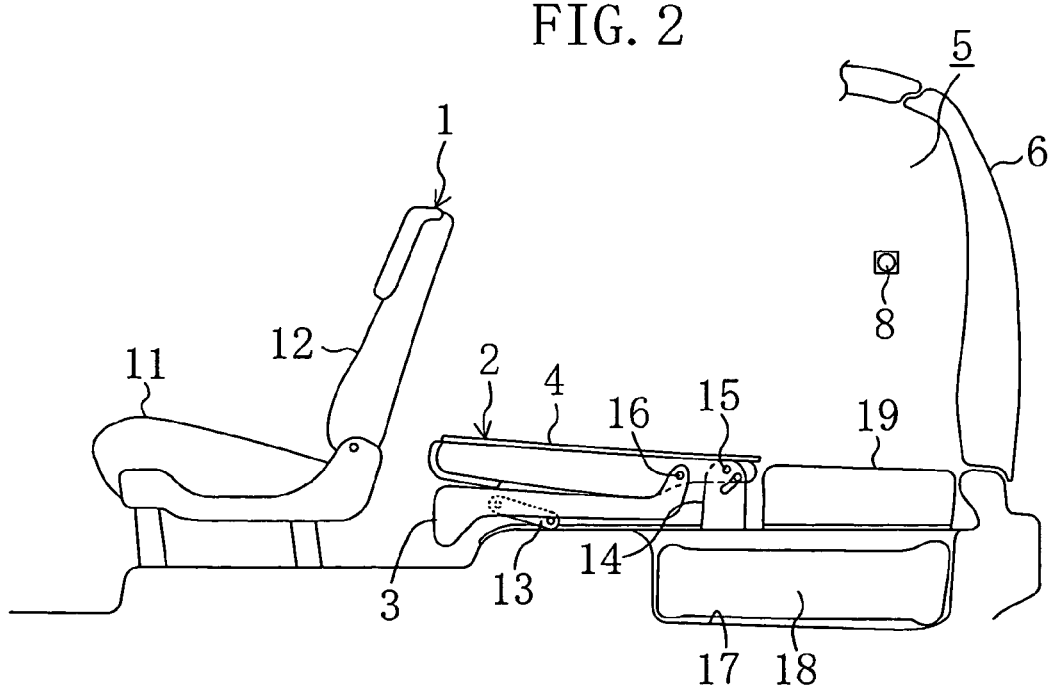
FIG. 2 is a view equivalent to FIG. 1, wherein a seat back of a back seat is folded forward.

With the above arrangement, when the seat back 4 is folded forward, the seat cushion 3 is pushed by the seat back 4, as shown in FIG. 2, to cause the link 13 to fall forward, so that the seat cushion 3 is lowered and the seat back 4 is in a forwardly folded state where it is laid over the seat cushion 3. When the seat back 4 is raised, the seat cushion 3 is drawn by the seat back 4 and the link 13 is raised, so that the seat cushion 3 is raised at a high level (see FIG. 1).

The seat back 4 of the back seat 2 is so set to be folded forward by a forwardly folding force biasing member described later from a predetermined raised state (a state where the seat back 4 is reclined backward at 15 to 25 degrees from a vertical line), which is retained by a retention mechanism described later. Also, the seat back 4 can be raised from the forwardly folded state to the predetermined raised state by an electric motor described later, and can be reclined backward appropriately. Further, manipulation strings 7, 7 as a manipulation member for releasing retention by the retention mechanism are provided at the front face and the rear face of the seat back 4. A momentary type manipulation switch 8 for turning on/off the electric motor is provided on the sidewall of the luggage compartment 5. The manipulation switch 8 is turned off normally.

A downwardly recessed tire accommodating concave portion 17 is formed in the floor at the luggage compartment 5 so as to accommodate a spare tire 18. The tire accommodating concave portion 17 is covered at a front part thereof with a rear part of the back seat 2 and covered at a rear part thereof with a sub trunk 19. Small articles, for example, may be accommodated in the sub trunk 19. When the seat back 4 of the back seat 2 is folded and laid over the seat cushion 3, the upper face of the sub trunk 19 is substantially aligned to the back face of the seat back 4, as shown in FIG. 2. A baggage may be put on the back face of the folded seat back 4, which means expansion of the luggage compartment toward the passenger compartment. In other words, the seat back 12 of the intermediate seat 1 partitions the cabin into the passenger compartment in the front part and the luggage compartment 5 in the rear part.

<Construction of Rear Seat>

Figure 3:
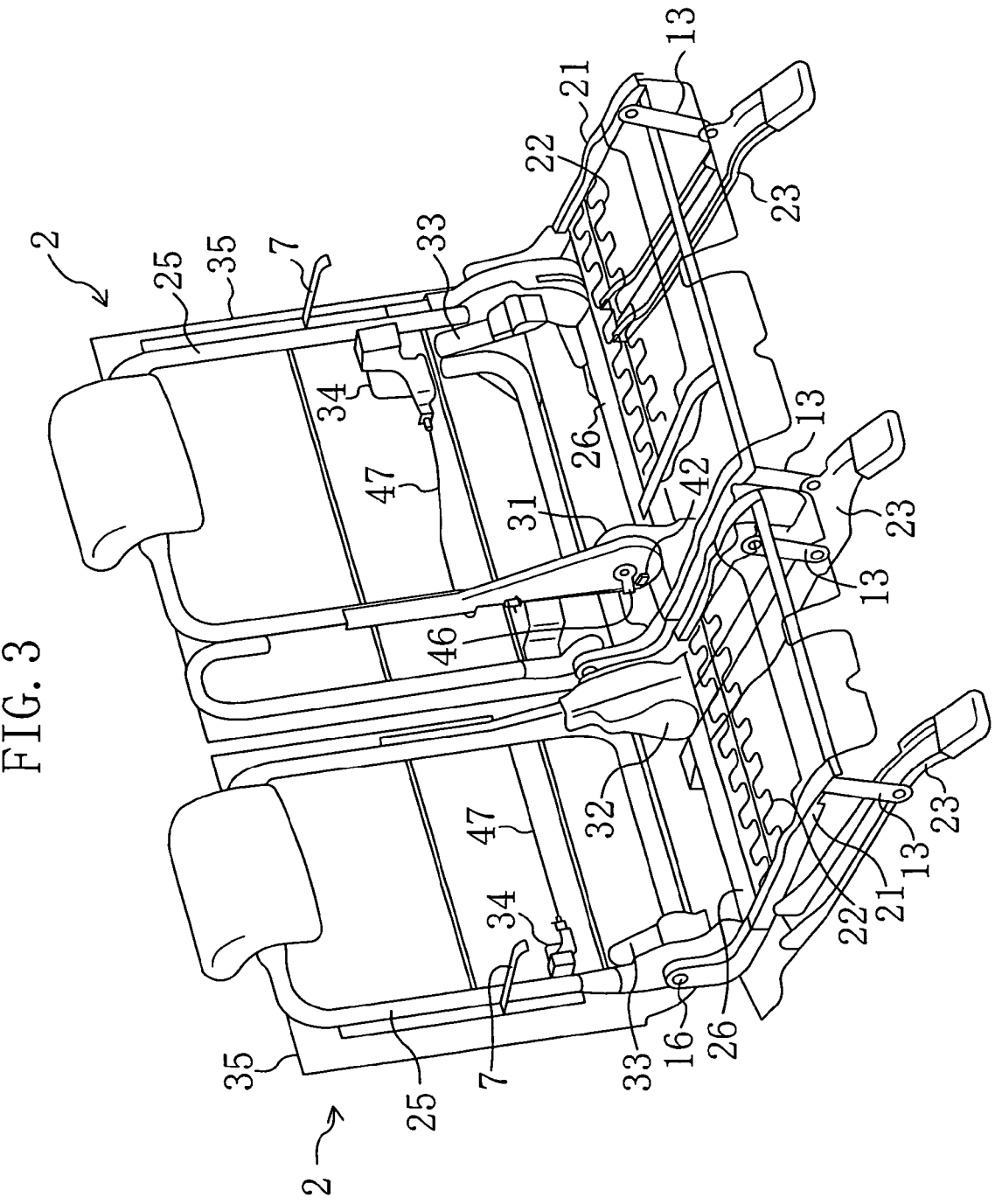
FIG. 3 is a perspective view showing a flame construction of back seats.

FIG. 3 shows a frame construction of the back seat 2 and a structure for mounting it to the vehicle floor. The vehicle includes right and left independent back seats 2 which have the same function according to the present invention, which will be described later. Therefore, the description of only the right seat as viewed from the front will be made below in detail. In FIG. 3, reference numeral 1 denotes a cushion frame for the seat cushion 3 and is provided with a spring 22 and the like. A front part of the cushion frame 21 is connected by means of the link 13 to a longitudinal frame 23 extending in back and forth directions and fixed to the floor. A cushion body (not shown in the drawing) is to be mounted on the cushion frame 21.

Further, in FIG. 3, a seat back frame 25 for the seat back 4 is supported so as to be capable of turning back and forth by a car width frame 26 extending in the car width direction and fixed to the floor. Specifically, a bracket 14 (not shown in FIG. 3) is fixed to the car width frame 26, and a lower end of the seat back frame 25 is connected to the bracket 14 by means of the pivot pin 15 (not shown in FIG. 3). A raised part at the rear end of the seat cushion frame 21 is connected by means of the pivot pin 16 to a part of the seat back frame 25 which is located above the pivot pin 15.

Though not shown specifically, a coil spring as a forwardly folding force biasing member for applying force so as to fold the seat back 4 forward is provided at a pivotal part of each seat back 4 of the right and left back seats 2. A knuckle 31 as a retention mechanism for retaining the seat back 4 in a predetermined raised state or a backwardly reclined or developed state is provided at a pivotal part on the vehicle central side out of the pivotal parts on the respective sides of the seat back 4. It is noted that in FIG. 3, the knuckle 31 itself is not shown because it is covered with an outer cover 32 in the right seat. The electric motor (a DC electric motor or a synchronous motor which generates a magnetic field by a permanent magnet and receives a direct current as an input) 33 with a speed reducer for raising the seat back 4 from the forwardly folded state or the backwardly reclined state to the predetermined raised state is provided in the vicinity of the pivotal part on the vehicle sidewall side out of the pivotal parts on the respective sides of the seat back 4.

To the seat back 4, a relay member 34 is provided for relaying manipulation power of the manipulation strings 7 and dividing and transmitting it to the knuckle 31 and the electric motor 33. The relay member 34 is provided with a biasing member for applying force in a direction where the manipulation strings 7 are drawn back. Further, at the back face of the seat back frame 25 for the seat back 4, a flat baggage plate 35 is fixed which forms a plane on which a baggage is to be put when the seat back 4 is folded forward and laid over the seat cushion 3.

<Drive Circuit for Electric Motor>

Figure 4:
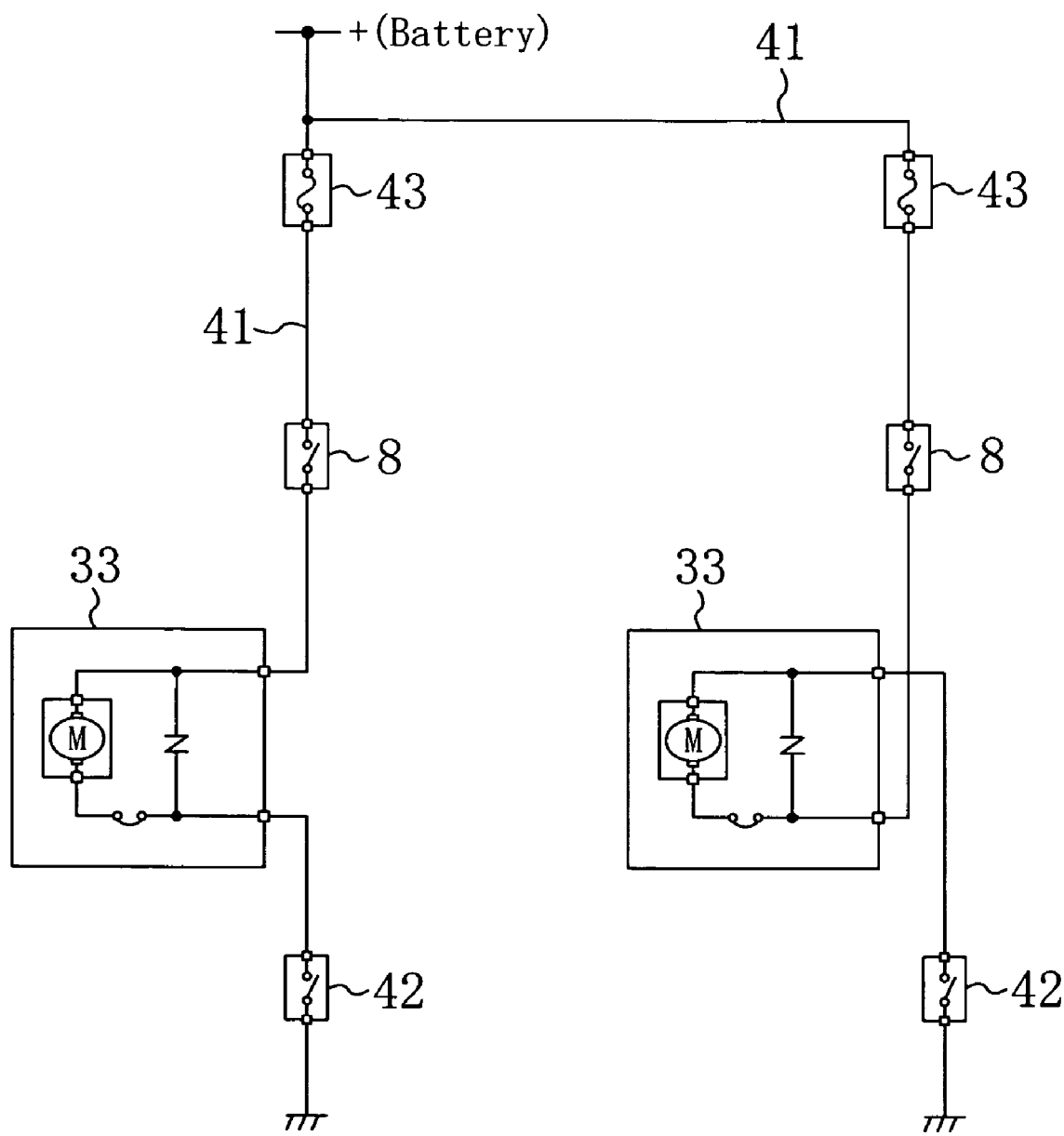
FIG. 4 is a circuit diagram of drive circuits for electric motors each for raising a seat back of a back seat.

As shown in FIG. 4, the electric motors 33 for the right and left back seats each include a varistor and a circuit breaker, and drive circuits 41 for the electric motors 33 are each provided with the aforementioned momentary type manipulation switch 8, a knuckle interlocking switch 42 as a compulsory cutting mechanism, and a fuse 43. The interlocking switch 42 is in an OFF state (a state where a corresponding drive circuit 41 is opened) during the time when the knuckle 31 retains the seat back 4. When the knuckle 31 is in the other state, the interlocking switch 42 is turned to an ON state by a knuckle lever described later, namely, is turned to a state where the corresponding electric motor 33 becomes conductive upon turning on the manipulation switch 8 (a state which allows the electric motor 33 to be conductive).

<Knuckle and Interlocking Switch>

Figure 5:
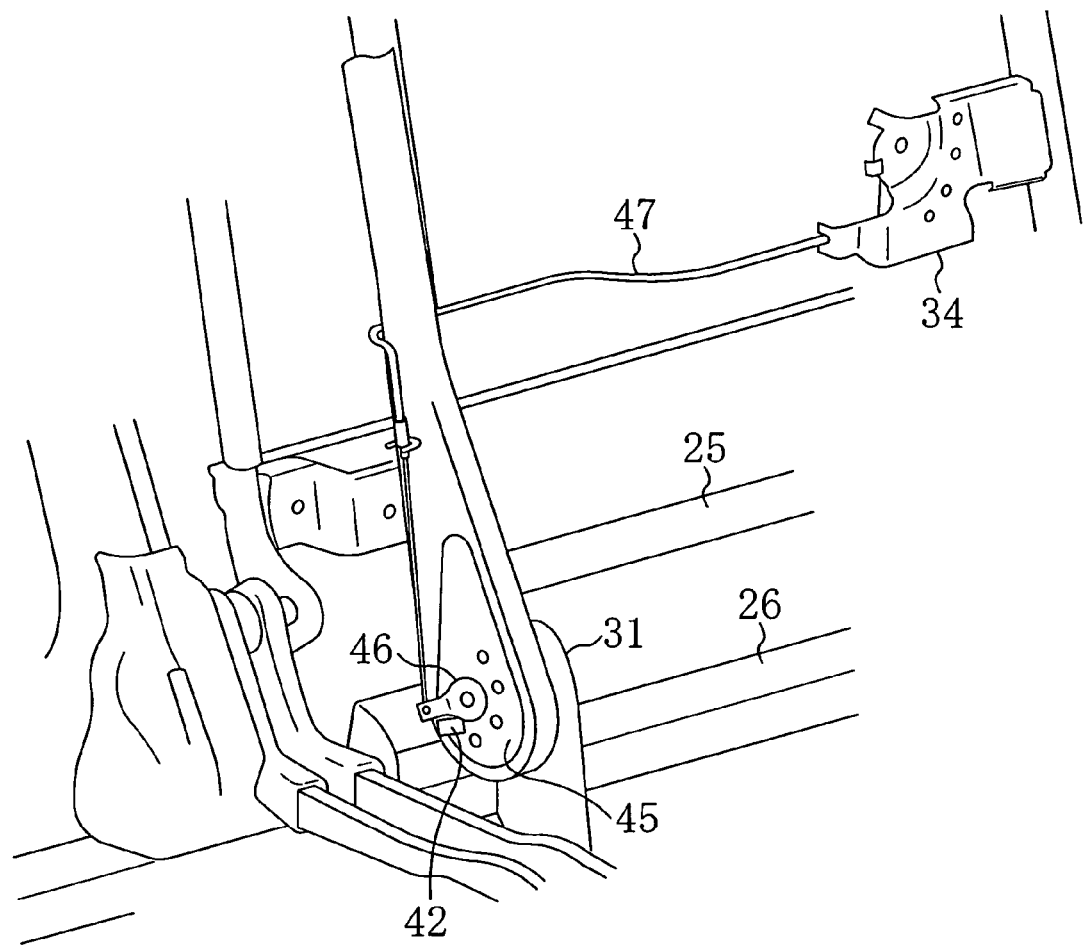
FIG. 5 is a perspective view showing a part where a knuckle is provided in the back seat.

As shown in FIG. 5, there are provided at a cover 45 covering the knuckle 31 the knuckle lever 46 and the interlocking switch 42, wherein the knuckle lever 46 serves as an operation member provided coaxially with the turning center of the seat back 4. A first cable 47 extending from the relay member 34 is connected to the knuckle lever 46. The interlocking switch 42 is arranged near the knuckle lever 46 so as be exchangeable between the ON state and the OFF state in direct response to the motion of the knuckle lever 46.

Figure 6:
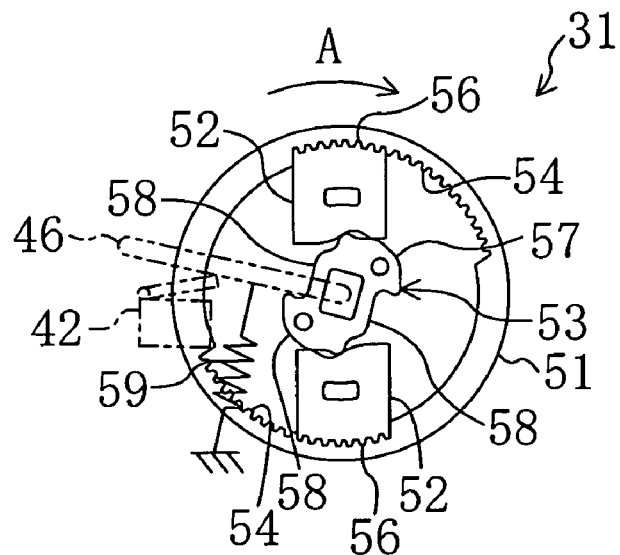
FIG. 6 is a front view showing the relationship between the knuckle and an interlocking switch in a state where the seat back is raised.
Figure 7:
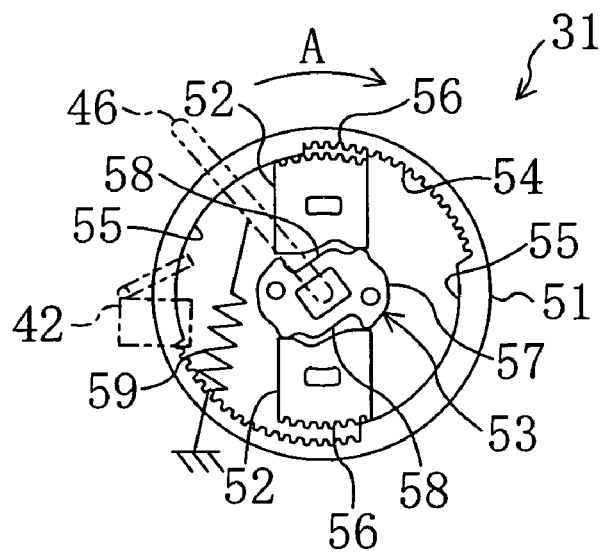
FIG. 7 is a view equivalent to FIG. 6, wherein the seat back is released from being retained.

A detailed description will be given below to the relationship between the knuckle 31 and the interlocking switch 42 with reference to FIG. 6 and FIG. 7. FIG. 6 and FIG. 7 show the knuckle lever 46 schematically. The knuckle 31 includes an internal gear (a first engaging member) 51 fixed to the seat back 4 coaxially with the turning center of the seat back 4, a pair of locking members (a second engaging member) 52 arranged inside the internal gear 51, and a cam member 53 for driving the locking members 52. The knuckle lever 46 is connected to the cam member 53, and the knuckle lever 46 and the cam member 53 compose an operation member for an engaging/releasing mechanism.

The internal gear 51 includes a pair of internal tooth parts 54 formed in the inner peripheral face of a ring member thereof so as to face each other with the axial center thereof (coaxial with the turning center of the seat back 4) interposed. Between the internal tooth parts 42, raised faces 55, which are higher in level than each tip of the internal tooth parts 54 are formed (raised so as to reduce the inner diameter of the internal gear 51).

The pair of locking members 52 face each other with the axial center of the ring member interposed, and locking tooth parts 56 engaging (meshing) with the internal tooth parts 54 are formed in the outward face of the locking members 52. The locking members 52 are supported to the vehicle or to the seat cushion (hereinafter "supported to the vehicle" means "supported to the vehicle or the seat cushion") so as to be movable in the radial direction of the internal tooth parts 51 and receive force of a biasing member (not shown) in a direction where engagement with the internal tooth parts 54 is released, namely, so as to be moveable toward the axial center of the internal gear 51. When the locking members 52 engage with the internal tooth parts 54 of the internal gear 51, the seat back 4 becomes in a locked state where it is retained in the predetermined raised state or the backwardly reclined state with respect to the vehicle. In other words, the seat back 4 is retained in the raised or backwardly reclined state against the force of the forwardly folding force biasing member (the coil spring). When the locking members 52 are released from the engagement, the seat back 4 becomes capable of turning relative to the vehicle, so as to be folded by the force of the forwardly folding force biasing member.

The cam member 53 is arranged between the pair of locking members 52 so as to be rotatable with the aforementioned axial center used as a center. A pair of engaging faces 57 opposed to each other with the axial center interposed and a pair of releasing faces 58 opposed to each other with the axial center interposed are formed in the peripheral face of the cam member 53 so as to be adjacent to one another in the peripheral direction thereof. As shown in FIG. 6, when the cam member 53 is rotated to cause the pair of engaging faces 57 to be in contact with the internal faces (axial center side) of the locking members 52 (a first state), the locking members 52 move outward against the force of the biasing member and are in the seat back locking state where they engage with the internal tooth parts 54. A distance from the axial center to each releasing faces 58 is shorter than that to each engaging face 57. Accordingly, when the releasing faces 58 are in contact with the internal faces (axial center side) of the locking members 52 by rotation of the cam member 53 (a second state), as shown in FIG. 7, the locking members 52 move inward by the force of the biasing member and is in a seat back releasing state where they are released from the engagement with the internal tooth parts 54.

A biasing member 59 applies force to the knuckle lever 46 and the cam member 53 in their turning directions so as to allow the engaging faces 57 to be in contact with the locking members 52 and allow the locking members 52 to engage with the internal tooth parts 54 for retaining the seat back 4 to the vehicle (the first state, see FIG. 6). When the knuckle lever 46 is pulled by the manipulation strings 7 through the first cable 47, the cam member 53 is rotated to allow the releasing faces 58 to be in contact with the internal faces of the locking members 52 (a seat back releasing state, the second state, see FIG. 7).

In the present embodiment, the engaging/releasing mechanism is composed of the manipulation strings 7, the relay member 34, the first cable 47, the knuckle lever 46, the cam member 53, and the biasing member 59.

As shown in FIG. 6, the interlocking switch 42 is so arranged to be in the OFF state where it is in contact with the knuckle lever 46 when the knuckle lever 46 is in the first state (the seat back locking state). As shown in FIG. 7, when the knuckle lever 46 moves to a seat back releasing point away from the interlocking switch 42 (to be in the second state), the interlocking switch 42 is in the ON state.

Figure 8:
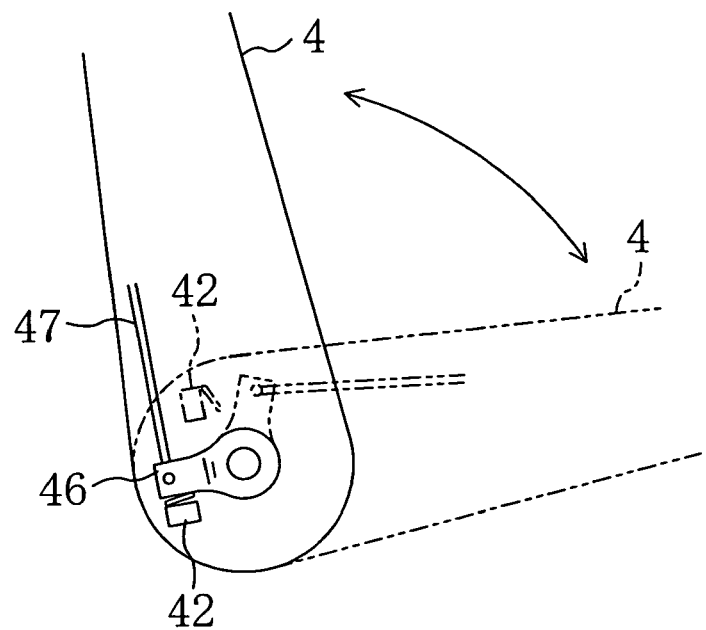
FIG. 8 is a side view showing the relationship between a knuckle lever and the interlocking switch in the state where seat back is raised and in a state where the seat back is folded forward.

In FIG. 8, the solid lines indicate the state where the seat back 4 is raised, while the dashed-two-dotted lines indicate the state where the seat back 4 is folded forward. In the aforementioned predetermined raised state, the interlocking switch 42 is in contact with the knuckle lever 46 and is in the OFF state. When the knuckle lever 46 is pulled by the manipulation strings 7, the locking members 52 are in the seat back releasing state and the 20 knuckle lever 46 moves away from the interlocking switch 42, so that the interlocking switch is in the ON state.

In the state where the interlocking switch 42 is in the ON state, as the seat back 4 is folded by the force of the forwardly folding force biasing member (the coil spring), as shown by the dashed-two-dotted lines in FIG. 8, the internal gear 51 is rotated in the direction indicated by the arrow A together with the seat back 4, as shown in FIG. 7. Accordingly, the locking members 52 ride on the raised faces 55 of the internal gear 51. This state is a state where the locking members 52 inhibit the cam member 53 from returning to the seat back locking state against the force of the biasing member 59. Therefore, even if pulling of the manipulation strings 7 stops, the interlocking switch 42 is kept in the ON state.

In the present embodiment, the positional relationship between the internal gear 51 and the locking members 52 are so set that when the seat back 4 is in the predetermined raised state, the locking tooth parts 56 of the locking members 52 mesh with the internal tooth parts 54 formed at parts continued from the raised faces 55. Further, each range of the raised faces 55 is so set that even when the seat back 4 is in the completely folded state where it is folded forward and laid over the seat cushion 3 in the seat back releasing state, the locking tooth parts 56 of the locking members 52 face the raised faces 55 and do not mesh with the internal tooth parts 54. Accordingly, as indicated by the dashed-two-dotted lines in FIG. 8, the interlocking switch 42 is kept in the ON state (a state allowing the electric motor 33 to be conductive) even when the seat back 4 is in the completely folded state.

When the manipulation switch 8 is turned on, the electric motor 33 is activated to raise the seat back 4. Then, when the seat back 4 becomes in the predetermined raised state, the locking tooth parts 56 of the locking members 52 mesh with the internal tooth parts 54 of the internal gear 51 so that the seat back 4 is retained in the predetermined raised state. At the same time, the interlocking switch 42 becomes in the OFF state to cut electric conduction to the electric motor 33, thereby stopping the electric motor 33. As a result, no torque is generated.

Figure 9:
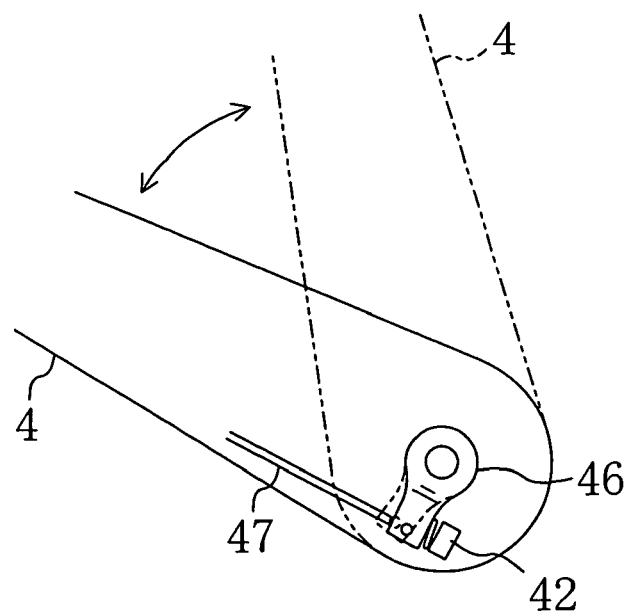
FIG. 9 is a view equivalent to FIG. 8, wherein the seat back is in the raised state and in the forwardly folded state.

When the seat back 4 in the predetermined raised state as indicated by the dashed-two-dotted lines in FIG. 9 is released by pulling of the manipulation strings 7, the seat back 4 can be reclined backward as indicated by the solid lines by pushing the seat back 4 against the force of the forwardly folding force biasing member. When pulling of the manipulation strings 7 stops, the cam member 53 is rotated by the force of the biasing member 59 to allow the locking members 52 to mesh with the internal tooth parts 54 of the internal gear 51, thereby retaining the seat back 4 in a backwardly reclined state at an appropriate angle. Each internal tooth part 54 of the internal gear 51 is formed within a predetermined range in the peripheral direction of the internal gear 51 so that the seat back 4 can be retained at any of appropriate angles from an angle at the predetermined raised state to an angle where the seat back 4 is reclined backward and is substantially horizontal. The state where the locking members 52 retain the seat back 4 reclined backward at a given angle is a state where the knuckle lever 46 is turned by the force of the biasing member 59 and is in contact with the interlocking switch 42 (the state indicated by the solid lines in FIG. 9). Accordingly, the interlocking switch 42 is in the OFF state, and therefore, the electric motor 33 is not activated even if the manipulation switch 8 is turned on.

<Seat Back Raising Mechanism by Electric Motor>

Figure 10:
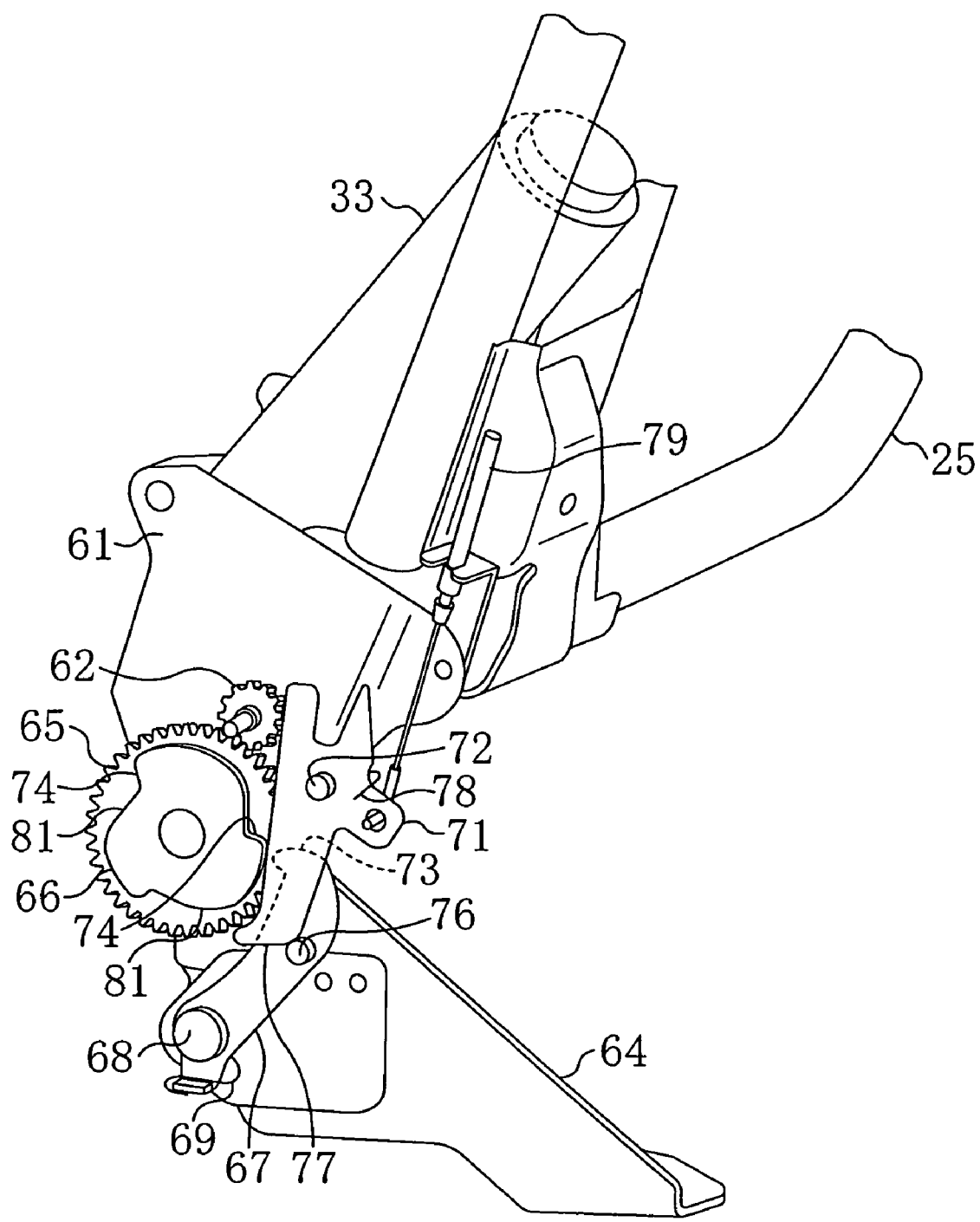
FIG. 10 is a perspective view of a seat back raising mechanism in the state where the seat back is raised.
Figure 11:
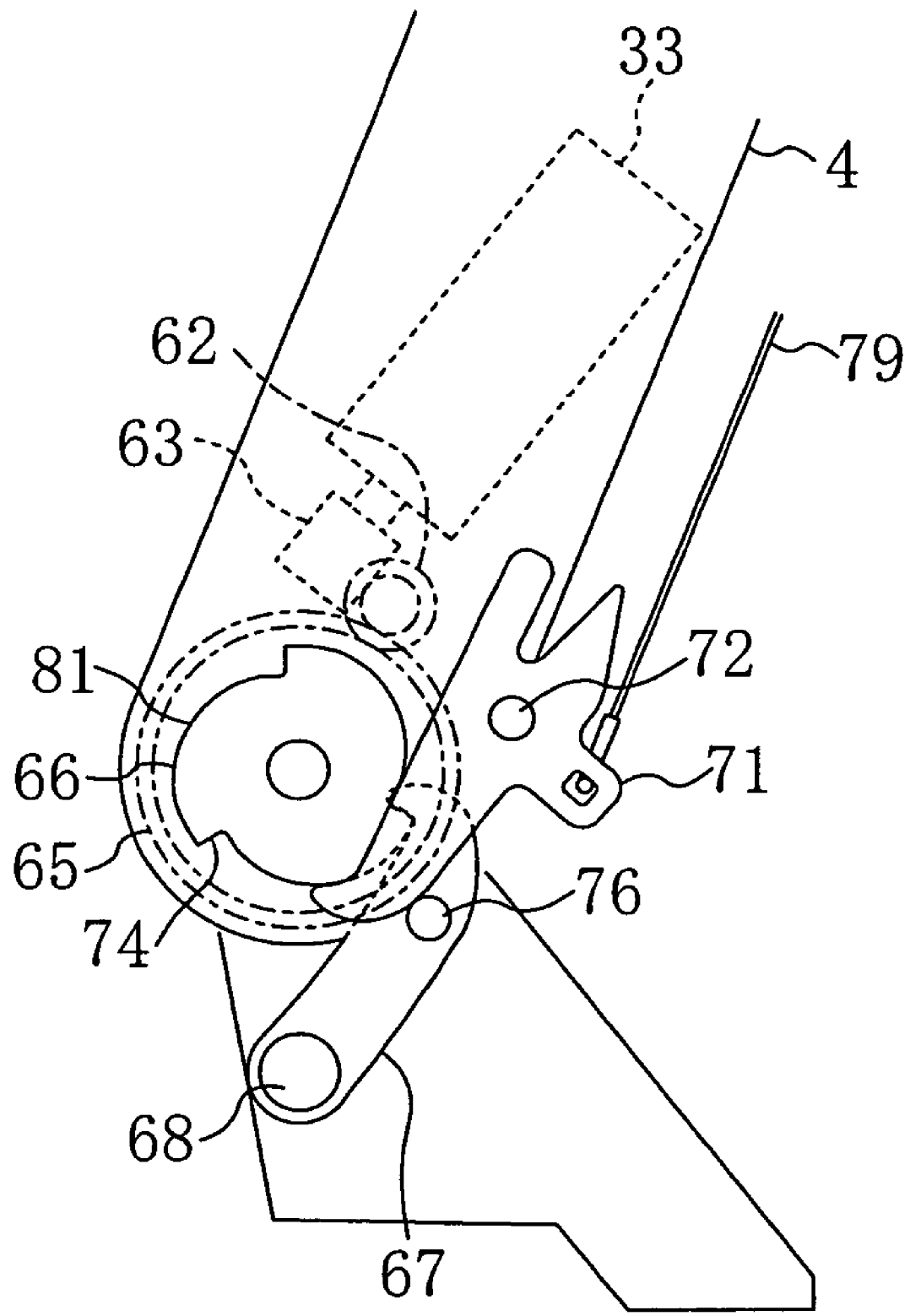
FIG. 11 is a side view showing the seat back raising mechanism in the state where the seat back is raised.

As shown in FIG. 10, a motor supporting member 61 is fixed to the seat back frame 25 for the back seat 2, and the electric motor 33 is supported by the motor supporting member 61. A drive gear 62, which is rotated by the output shaft of the electric motor 33 and of which an axial center extends in the car width direction, is supported by the motor supporting member 61. As shown in FIG. 11, the drive gear 62 is driven and rotated through a worm 63 connected to the output shaft of the electric motor 33. A combination of the electric motor 33 and the worm 63 is called an electric motor herein, wherein the present invention includes the case where the drive gear 62 is driven by the electric motor 33 without intervention of the worm 63. A driven gear 65 is supported by a supporting bracket 64, which is fixed to the vehicle floor rotatably and coaxially with the turning center of the seat back 4 of the back seat 2. The driven gear 65 meshes with the drive gear 62

An engaging gear 66 is formed integrally with the driven gear 65 so as to be rotated together with the driven gear 65. A hooking member 67 capable of engaging with the engaging gear 66 is supported at the support bracket 64 by a support shaft 68 extending in the car width direction. Wherein, a biasing member 69 (a coil spring) applies force to the hooking member 67 so that the hooking member 67 turns in the direction where the hooking member 67 engages with the engaging gear 66. In the motor supporting member 61, a releasing lever 71 capable of turning is supported by a support shaft 72 extending in the car width direction. The releasing lever 71 releases the engagement of the hooking member 67 with the engaging gear 66 against the force of the biasing member 69. In this case, the engaging gear 66 and the hooking member 67 compose a clutch for inhibiting the driven gear 65 from being rotated together with the seat back 4.

In the engaging gear 66, a plurality of engaging teeth 74 are formed at a predetermined pitch in the peripheral direction thereof so as to engage with a hook end 73 of the hooking member 67. The tooth face (engaging face) of each engaging tooth 74 is formed in parallel to the axial center of the driven gear 65, faces the front side in the seat back forwardly folding direction, and rises substantially in the radial direction of the driven gear 65. Further, the pitch of the engaging teeth 74 is set at 120 degrees which is slightly larger than a forwardly foldable angle range (100 to 115 degrees) of the seat back 4 between an angle at the predetermined raised state and an angle at the completely forwardly folded state. Accordingly, in the present example, the number of the engaging teeth 74 is three. Wherein, the number of the engaging teeth 74 may be one or two.

When the hook end 73 of the hooking member 67 engages with one of the engaging teeth 74 of the engaging gear 66, the driven gear 65 is inhibited from being rotated in the seat back forwardly folding direction. Therefore, when the hooking member 67 engages therewith in the state where the seat back 4 is in the forwardly folded state and the electric motor 33 is activated to rotate the drive gear 62 in the seat back raising direction, the driven gear 65 which is inhibited by the hooking member 67 from rotating receives rotational counter force of the drive gear 62. Whereby, the drive gear 62 is rotated and moves around the driven gear 65 in the seat back turning direction, namely, the positional relationship between the drive gear 62 and the driven gear 63 meshing with each other changes, so that the seat back 4 is being raised. In other words, the torque of the electric motor 33 is transmitted to the vehicle through the drive gear 62 and the driven gear 63 to raise the seat back 4.

In the present embodiment, the electric motor 33 is so set that time required for changing the seat back 4 from the completely forwardly folded state to the predetermined raised state is within seven seconds (preferably, three to four seconds). Further, the forwardly folding force biasing member is so set that time required for changing the seat back 4 from the predetermined raised state to the completely forwardly folded state is shorter than the time required for changing the seat back 4 from the completely forwardly folded state to the predetermined raised state. This shortens times required for changing the seat back 4 between the completely forwardly folded state and the predetermined raised state with safety ensured, thereby enhancing convenience.

<Transmission Releasing Means>

The hooking member 67 includes a pin 76 as a receiving part for receiving releasing force from the releasing lever 71. The releasing lever 71 includes a pin receiving part 77 to be in contact with the pin 76 of the hooking member 67 from the side where the engaging gear 66 is present. The releasing lever 71 receives force of a biasing member (a spring) 78 in a direction where the pin receiving part 77 moves away from the pin 76 (toward the engaging gear 66). A second cable 79 extending from the aforementioned relay member 34 and connected to the manipulation strings 7 is connected to the releasing lever 71. Accordingly, when the manipulation strings 7 are pulled, the pulling force thereof is transmitted to the releasing lever 71 through the second cable 79 to cause the releasing lever 71 to turn the hooking member 67 against the force of the biasing member 78, namely, to turn it in the direction where the engagement of the hooking member 67 with the engaging gear 66 is released. In this case, the manipulation strings 7, the relay member 34, the second cable 79, the releasing lever 71, and the biasing member 78 compose a transmission releasing mechanism for releasing the driven gear 65 in a state inhibited by the clutch from being rotated, so that the electric motor 33 is prevented from restraining forwardly folding of the seat back 4.

When the seat back 4 starts being folded forward from the predetermined raised state in the state where the releasing lever 71 allows the hooking member 67 to turn and move away from the engaging gear 66, the releasing lever 71 moves in the direction away from the hooking member 67 in association with turning of the seat back 4. Accordingly, the pin receiving part 77 of the releasing lever 71 becomes out of contact with the pin 76 of the hooking member 67, so that the hooking member 67 returns in the direction where it engages with the engaging gear 66.

Cam faces 81 are formed between the engaging teeth 74 adjacent to each other in the peripheral direction of the engaging gear 66. The tip end of the hook end 73 of the hooking member 67 of which engagement with one of the engaging teeth 74 is released is in contact with one of the cam faces 81 by the force of the biasing member 69 during forwardly folding of the seat back 4. The cam faces 81 receive the force of the biasing member 69 through the hook end 73 to promote the engaging gear 66 to be rotated in the seat back forwardly folding direction together with the rotation of the driven gear 65.

Accordingly, the cam faces 81 are so formed (inclined) to decrease the radius of the engaging gear 66 from the tooth ends (parts farthest from the axial center of the engaging gear 66) of the engaging teeth 74 toward the tooth base ends (parts nearest the axial center thereof) of the engaging teeth 74 adjacent to another one on the rear side in the seat back forwardly folding direction. Further, the hooking member 67 is so set to apply force of the biasing member 69 to one of the cam faces 81 in the direction at a sharp angle formed on the front side in the rotating direction.

Figure 12:
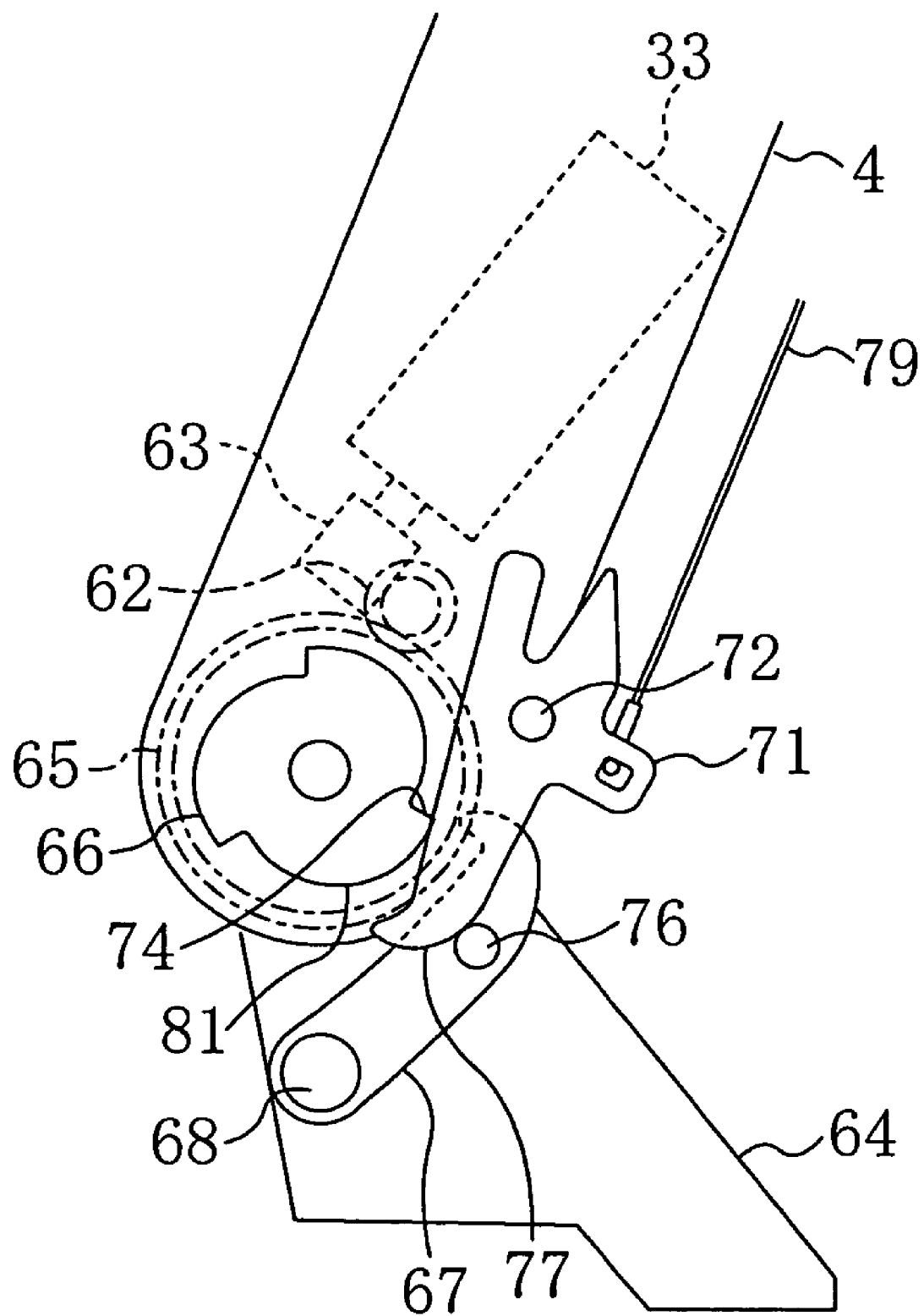
FIG. 12 is a side view showing the seat back raising mechanism in a state where manipulation strings are pulled in the seat back raised state.

Thus, as shown in FIG. 11, when the seat back 4 is in the predetermined raised state, the hooking member 67 engages with one of the engaging teeth 74 of the engaging gear 66. When the manipulation strings 7 are pulled, the releasing lever 71 turns in the releasing direction, as shown in FIG. 12, to allow the hooking member 67 to turn in the releasing direction, thereby causing the hooking member 67 to be out of contact with the currently engaging engaging tooth 74 of the engaging gear 66. In turn, the driven gear 65 retained to the vehicle by the hooking member 67 is released so as to be rotatable in the seat back forwardly folding direction together with the seat back 4 that receives the force by the coil spring as the forwardly folding force biasing member.

Accordingly, when the seat back 4 is folded forward, the driven gear 65 is rotated in the forwardly folding direction together with the seat back 4. This means no change in positional relationship between the drive gear 62 and the driven gear 65 meshing with each other. In other words, the output shaft of the electric motor 33 needs not be rotated through the drive gear 62 in the direction reverse to the seat back raising direction. Therefore, forwardly folding of the seat back 4 is prevented from receiving counter torque, which is generated by rotating the electric motor 33 by external force, and rotational resistance by the speed reducers, such as engagement between the drive gear 62 and the driven gear 65, engagement between the drive gear 65 and the worm 63, and the like.

Figure 13:
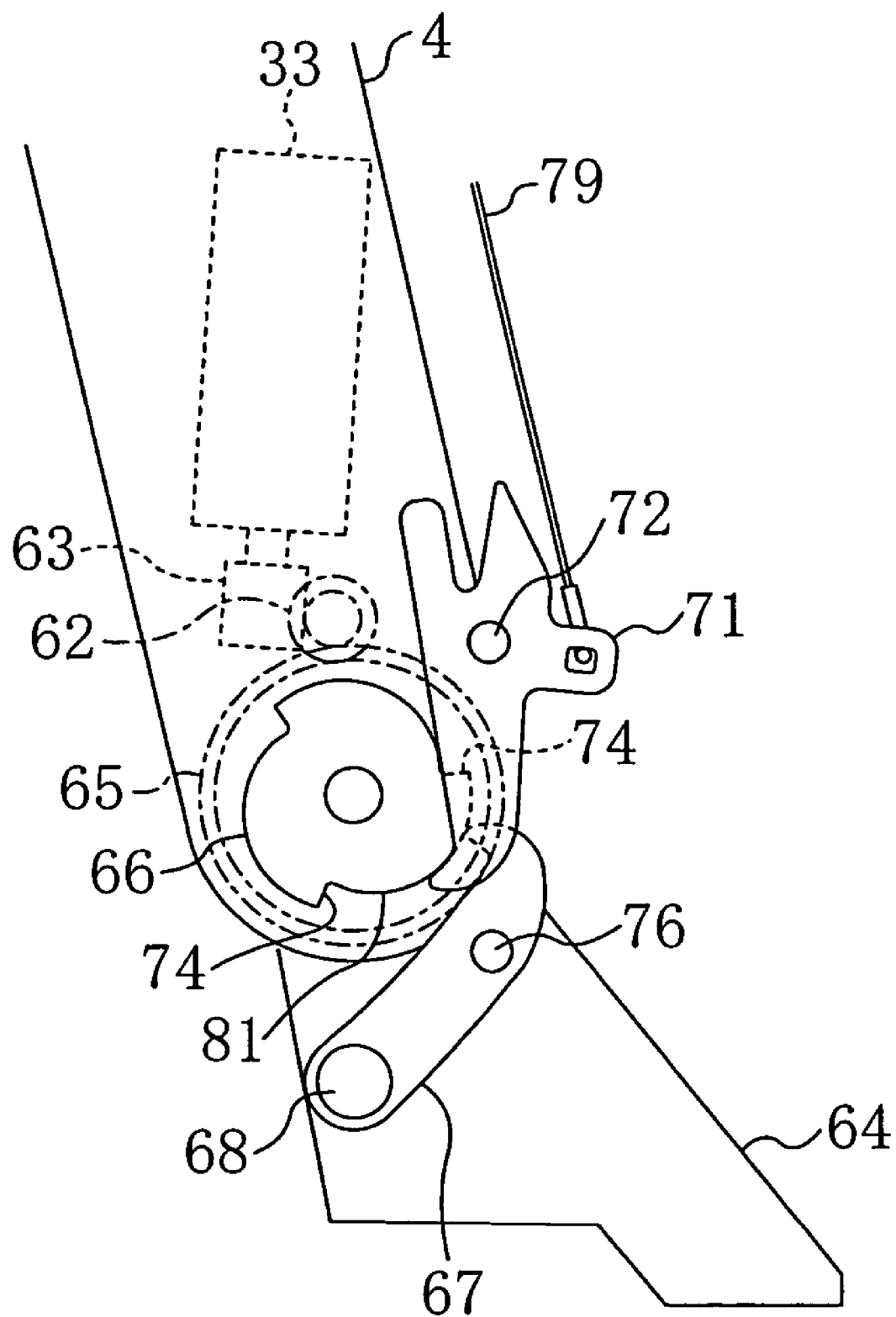
FIG. 13 is a side view showing the seat back raising mechanism in the middle of forwardly folding of the seat back.

After the seat back 4 starts being folded forward, the releasing lever 71 moves away from the hooking member 67 in association with the turning of the seat back 4. Whereby, as shown in FIG. 13, the pin receiving part 77 of the releasing lever 71 is out of contact with the pin 76 of the hooking member 67 to allow the hook end 73 of the hooking member 67 to be in contact with one of the cam faces 81 of the engaging gear 66 by the force of the biasing member 69. As a result, the driven gear 65 receives force of the biasing member 69 so as to be rotated in the seat back forwardly folding direction. Hence, the driven gear 65 is rotated together with the seat back 4 securely in the seat back forwardly forming direction.

Figure 14:
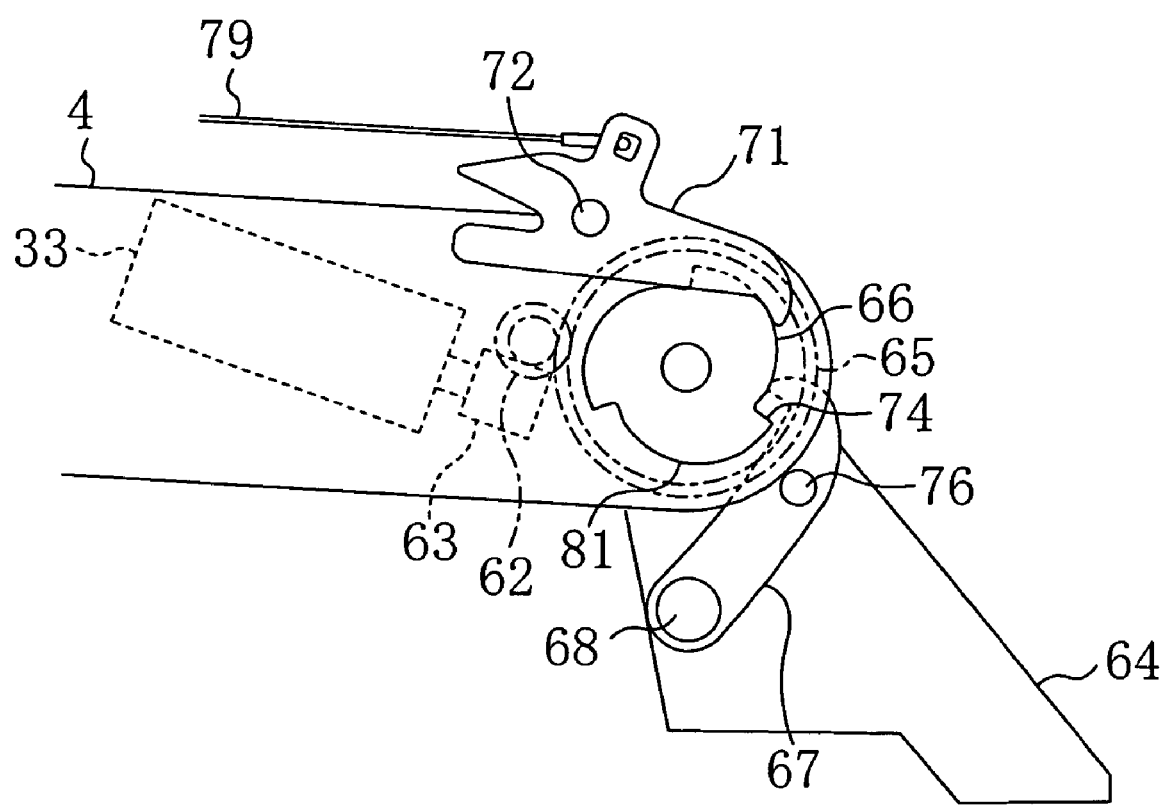
FIG. 14 is a side view showing the seat back raising mechanism in a state where the seat back is folded forward.

As shown in FIG. 14, when the seat back 4 is in the completely forwardly folded state, the hooking member 67 becomes capable of engaging with an engaging tooth 74 adjacent to the currently contacting cam face 81 of the engaging gear 66, namely, an engaging tooth 74 next thereto. Therefore, when the electric motor 33 is activated, the drive gear 62 rolls on the driven gear 65 to raise the seat back 4. The pitch of the engaging teeth 74 is set at 120 degrees as described above. Therefore, in the case where the electric motor 33 is not rotated in forwardly folding of the seat back 4, the tip end of the hooking member 67 is located immediately before the adjacent engaging tooth 74 when the seat back 4 is completely folded forward. As a result, lag time from the activation of the electric motor 33 to the time point when the hooking member 67 engages with the adjacent engaging tooth 74 upon the activation and the seat back 4 starts being raised is shortened, resulting in an advantage to quick raising of the seat back 4.

<Operation of Rear Seat>

A description will be given to operations of the respective members in operation of the back seat 2 structured as above.

-Forwardly Folding of Rear Seat-

When the seat back 4 is in the predetermined raised state, the knuckle 31 is in the state where the knuckle lever 46 is turned downward by the force of the biasing member 59, as shown in FIG. 6. Therefore, the engaging faces 57 of the cam member 53 are in contact with the locking members 52, and the locking members 52 engage with the internal tooth parts 54 of the internal gear 51, so that the seat back 4 is retained in the raised state. Further, the knuckle lever 46 is in contact with the interlocking switch 42 (the state indicated by the solid lines in FIG. 9), so that the interlocking switch 42 is in the OFF state. Therefore, the electric motor 33 is not activated even if the manipulation switch 8 is turned on. In the raising mechanism of the electric motor 33, the hooking member 67 engages with one of the engaging teeth 74 of the engaging gear 66, as shown in FIG. 11.

In the predetermined raised state as above, when the manipulation strings 7 are pulled, the knuckle lever 46 of the knuckle 31 is pulled by the first cable 47 to turn upward together with the cam member 53, releasing the seat back 4 retained by the locking members 52 (see FIG. 7). In other words, the seat back 4 is ready to be folded forward by the force of the forwardly folding force biasing member. In the raising mechanism, the releasing lever 71 is pulled by the second cable 79 to allow the hook end 73 of the hooking member 67 to be out of contact with engaging one of the engaging teeth 74 of the engaging gear 66, so that the driven gear 65 becomes rotatable relative to the vehicle (see FIG. 12).

Accordingly, when the seat back 4 is folded forward by the force of the forwardly folding force biasing member, the driven gear 65 is rotated in the seat back forwardly folding direction together with the seat back 4. Therefore, the drive gear 62 of the electric motor 33 substantially needs not be rotated, thereby preventing the electric motor 33 from restraining forwardly folding of the seat back 4. Specifically, when the worm 63 is connected to the output shaft of the electric motor 33 and engages with the drive gear 62 as in the present embodiment, the worm 63 restrains the rotation of the drive gear 62. The drive gear 62, however, needs not be rotated in the reverse direction when the seat back 4 is folded forward, as described above, preventing the worm 63, namely, the electric motor 33 from restraining forwardly folding of the seat back 4. Thus, the seat back 4 can be folded forward quickly and reliably only by the force of the forwardly folding force biasing member with no large man power necessitated, which means no burden on a passenger in forwardly folding of the seat back 4.

When the seat back 4 starts being folded forward from the predetermined raised state, the releasing lever 71 moves away from the hooking member 67, as shown in FIG. 13, to allow the hook end 73 of the hooking member 67 to be in contact with one of the cam faces 81 of the engaging gear 66 by the force of the biasing member 69. Then, the biasing member 69 applies rotational force in the seat back forwardly folding direction to the engaging gear 66 to promote the rotation of the driven gear 65 in the seat back forwardly folding direction. Thus, rotational force in the reverse direction is prevented from being generated in the drive gear 62, namely, the electric motor 33 is prevented from restraining forwardly folding of the seat back 4. When the seat back 4 becomes in the completely forwardly folded state where the seat back 4 is laid over the seat cushion 3, the hooking member 67 engages with an engaging tooth 74 adjacent to the contacting cam face 81 of the engaging gear 66, as shown in FIG. 14.

Even when pulling of the manipulation strings 7 stops before the releasing lever 71 is out of contact with the hooking member 67, the hooking member 67 is once out of contact with the currently engaging engaging tooth 74 of the engaging gear 66 and, then, is in contact with the next cam face 81 by the forwardly folding of the seat back 4.

Referring to the knuckle 31, as shown in FIG. 7, the internal gear 51 is rotated together with the seat back 4 upon start of forwardly folding of the seat back 4, so that the locking members 52 ride on the raised faces 55 of the internal gear 51. The seat back 4 becomes in the completely forwardly folded state with the locking members 52 riding on the raised faces 55. Therefore, even pulling of the manipulation strings 7 stops in the middle of forwardly folding of the seat back 4, the seat back 4 continues being forwardly folded by the force of the forwardly folding force biasing member. Riding of the locking members 52 on the raised faces 55 separates the knuckle lever 46 from the interlocking switch 42 to allow the interlocking switch 42 to be in the ON state (the state where the electric motor 33 is allowed to be conductive upon turning on of the manipulation switch 8). Accordingly, the ON state is kept even if pulling of the manipulation strings 7 stops.

The locking tooth parts 56 of the locking members 52 ride on the raised faces 55 of the internal gear 51 when pulling of the manipulation strings 7 stops, so that the knuckle lever 46 does not return completely, causing the first cable 47 to sag.

When forwardly folding of the seat back 4 causes the seat back 4 to push the seat cushion 3, the link 13 is allowed to fall forward as shown in FIG. 12, thereby lowering the seat cushion 3 with the seat back 4 laid thereover. Hence, the luggage compartment 5 is expanded toward the passenger compartment so that a baggage may be put on the back face of the seat back 4.

-Raising of Seat Back-

In the completely forwardly folded state of the seat back 4 where it is laid over the seat cushion 3, the interlocking switch 42 is in the ON state as described above. Accordingly, when the manipulation switch 8 at the luggage compartment 5 is pushed, the electric motor 33 is activated by electric conduction from a battery (see FIG. 4). Further, in the completely forwardly folded state, the hooking member 67 engages with one of the engaging teeth 74 of the engaging gear 66, and the driven gear 65 is inhibited from being rotated in the seat back forwardly folding direction, as shown in FIG. 14.

When the drive gear 62 is rotated upon activation of the electric motor 33, the driven gear 65 receives the rotational counter force thereof, so that the drive gear 62 rolls on the teeth of the driven gear 65, thereby raising the seat back 4. During raising of the seat back 4, since the locking members 52 of the knuckle 31 remain riding on the raised faces 55 of the internal gear 51, as shown in FIG. 7, the interlocking switch 42 is kept in the ON state. Hence, the electric motor 22 is kept working as long as the manipulation switch 8 is pushed for turning it on.

When the seat back 4 becomes in the predetermined raised state shown in FIG. 11, the internal tooth parts 54 of the internal gear 51 face the locking members 52, so that the locking members 52 mesh with the internal tooth parts 54 to retain the seat back 4 in the predetermined raised state. At the same time, the knuckle lever 46 turns downward by the force of the biasing member 59 and becomes in contact with the interlocking switch 42, thereby allowing the interlocking switch 42 to be in the OFF state. Therefore, even if the manipulation switch 8 is continued to be pushed, the interlocking switch 42 cuts electric conduction to the electric motor 33, so that the electric motor 33 generates no torque.

As described above, continual pushing of the manipulation switch 8 leads to raising of the seat back 4 up to the predetermined raised state. When the seat back 4 becomes in the predetermined raised state, the electric motor 33 stops working even pushing of the manipulation switch 8 is continued still, thereby reliably retaining the seat back 4 in the predetermined raised state. Hence, a passenger is not required to confirm a raised state of the seat back 4 in manipulating the manipulation switch 8 for raising the seat back 4 from the forwardly folded state. Also, the seat back 4 can be reliably set in the predetermined raised state by manipulation of the manipulation switch 8 provided even at the luggage compartment 5 distant from the back seat 3. In consequence, the seat back 4 is prevented from being in a state more upright than the predetermined state or from being reclined excessively backward, preventing poor riding comfort and preventing the baggage accommodating space behind the seat back 4 from being excessively narrowed.

Further, the electric motor 33 generates no torque, so that the seat back 4, the knuckle 31, and the like is prevented from being overloaded, increasing durability of the back seat 2.

The manipulation switch 8 is of momentary type. Therefore, when a passenger puts his/her hand off from the manipulation switch 8 in the middle of raising of the seat back 4, the electric conduction to the electric motor 33 is cut to cause the seat back 4 to stop being raised. Even if, in the middle of raising of the seat back 4 by the electric motor 33, an object is ready to be caught between the seat back 4 and the vehicle sidewall or a baggage in the luggage compartment 5 is ready to be broken upon abutment of the seat back 4 thereon, such trouble can be obviated when a passenger only puts his/her hand off from the manipulation switch 8 to stop raising of the seat back 4 in the middle of the course. In other words, a passenger in the luggage compartment 5 can raise the seat back 4 from the forwardly folded state with safety confirmed.

When the electric motor 33 is stopped in the middle of raising of the seat back 4, the hooking member 67 engages with one of the engaging teeth 74 of the engaging gear 66, and the driven gear 65 is inhibited from rotating in the seat back forwardly folding direction. Accordingly, the electric motor 33 restrains immediate folding of the seat back 4 though the seat back 4 are receiving force of the forwardly folding force biasing member. When the manipulation switch 8 is turned on again after the electric motor 33 is stopped in the middle of raising of the seat back 4, the seat back 4 is raised to and retained in the predetermined raised stated and the electric motor 33 is stopped.

When the manipulation switch 8 is turned on by pulling the manipulation strings 7 in the middle of forwardly folding of the seat back 4 from the raised state, the seat back 4 returns to the predetermined raised state. Because: during the time when the seat back 4 is being folded forward, the interlocking switch 42 is in the ON state, as described above, and the electric motor 33 becomes conductive when the manipulation switch 8 is turned on. Wherein, as shown in FIG. 13, the hooking member 67 is out of contact with the engaging teeth 74 of the engaging gear 66 and is in contact with one of the cam faces 81 during the forwardly folded state of the seat back 4, so that the seat back 4 does not immediately turn in the raising direction even though the drive gear 64 is rotated by the electric motor 33. The seat back 4 starts being raised only after the driven gear 65 is rotated by the drive gear 62 in the seat back forwardly folding direction together with the engaging gear 66 to allow one of the engaging teeth 74 of the engaging gear 66 to engage with the hooking member 67 for inhibiting the driven gear 65 from being rotated in the seat back forwardly folding direction.

-Backward Reclining of Seat Back-

When the seat back 4 is in the predetermined raised state, the interlocking switch 42 is in the OFF state as described above. In this state, if the manipulation switch 8 is turned on in error for reclining the seat back 4 backward in the middle of the time when the manipulation strings 7 are pulled for releasing the seat back 4 retained by the knuckle 31, the electric motor 33 becomes conductive and is rotated because the interlocking switch 42 becomes in the ON state by the pulling of the manipulation strings 7. However, the pulling of the manipulation strings 7 releases the engagement of the hooking member 67 with the engaging gear 66, resulting in no torque transmission to the seat back 4 even by the activation of the electric motor 33. In other words, the seat back 4 does not fall backward by the electric motor 33, improving safety.

In order to recline the seat back 4 backward, the seat back 4 must be pushed backward against forwardly folding force of the seat back 4 by force of the forwardly folding force biasing member while the manipulation strings 7 are being pulled. For example, a passenger sitting on the back seat 2 may push the seat back 4 backward by his/her back. Then, when pulling of the manipulation strings 7 stops at the time when the seat back 4 is at an appropriate backwardly reclined angle, the locking members 52 of the knuckle 31 engage with the internal tooth parts 54 of the internal gear 51 to allow the seat back 4 to be retained at the backwardly reclined angle.

During the time when the manipulation strings 7 are pulled, the hooking member 67 is separated from the engaging gear 66, as shown in FIG. 12. Therefore, the driven gear 65 is free from resistance by the hooking member 67 and is rotatable in the seat back backwardly reclining direction. Accordingly, the driven gear 65 is rotated backward together with the seat back 4 with the positional relationship with the engaging drive gear 62 maintained, so that the electric motor 33 does not restrain backward reclining of the seat back 4.

Further, the second cable 79 restricts the posture of the releasing lever 71 so that the releasing lever 71 is in contact with the pin 76 in the raised state of the seta back 4 and composes a torque transmission control mechanism for the electric motor 33. The releasing lever 71 inclines backward entirely as backward inclination of the seat back 4 is increased. In association with this increase in inclination, the hooking member 67 inclines backward to allow the engagement of the hooking member 67 with the engaging one of the engaging teeth 74 of the engaging gear 66 to be released. Accordingly, the engaging gear 66 idles (plays) together with the driven gear 65 even if the electric motor 33 is driven, preventing backward reclining of the seat back 4.

With the arrangement described above, even if the engagement of the hooking member 67 with the engaging gear 66 is not released due to abnormal degradation of the second cable or the like when a passenger sitting on the back seat 2 pulls the manipulation strings 7 for reclining the seat back 4 backward in the state where the manipulation switch 8 is manipulated inadvertently, the seat back 4 is prevented from being reclined when the backwardly reclined degree of the seat back 4 is at a predetermined degree or larger (when an angle formed between the seat back 4 and the horizontal line as viewed from a side is the predetermined degree or smaller). Further, even if abnormal backward reclining starts due to the above factor immediately after a passenger pulls the manipulation strings 7, the seat back 4 is prevented from being reclined backward when the backward reclining of the seat back 4 progresses and the backward reclined angle of the seat back 4 becomes the predetermined angle or larger. This prevents a baggage in the luggage compartment from being broken, and a passenger sitting on the back seat 2 feels less uncomfortable. It is noted that the predetermined angle is changeable according to the form or the position of the releasing lever, and it is possible to restrict further backward reclining of the seat back 4 when the seat back 4 is slightly reclined backward from the raised state. In other words, it is possible to restrict substantial backward reclining by the electric motor 33.

In addition, when the retention of the seat back 4 by the knuckle 31 is released by pulling the manipulation strings 7 in the state where the seat back 4 is in the backwardly reclined state, the seat back 4 tries to rise from the backward reclined state by the force of the forwardly folding force biasing member. Even in this case, the releasing lever 71 rotates to allow the hooking member 67 to be out of contact with the engaging gear 66, so that the seat back 4 can be raised with no restraint received from the electric motor 33. When the seat back 4 becomes at a desired angle and pulling of the manipulation strings 7 stops, the locking members 52 of the knuckle 31 are allowed to engage with the internal tooth parts 54 of the internal gear 51, thereby retaining the seat back 4 at the desired angle. Alternatively, continuation of pulling of the manipulation strings 7 continues the seat back 4 to being folded forward from the backward reclined state because the knuckle 31 is being released.

It is noted that in a vehicle in which the aforementioned back seat 2 is not arranged, the structure of the present embodiment may be applied to a seat corresponding to the intermediate seat 1.

The present invention is not limited to the embodiment described above and various improvements and design modifications of the present embodiment may be made without departing from the subject matter and scope of the present invention.

What is claimed is:

1. A device for a vehicle seat that includes a seat cushion and a seat back that turns around a part in the vicinity of a rear end of the seat cushion so as to be changeable between a predetermined raised state and a forwardly folded state where it is inclined and folded toward the seat cushion or it is laid over the seat cushion and that is arranged adjacently to and on a vehicle front side of a luggage compartment, comprising:

a forwardly biasing member configured to apply a force to turn the seat back in a direction in which the seat back changes to the forwardly folded state;

an engaging device including a first engaging member provided at the seat back and a second engaging member provided at the seat cushion or a vehicle and being engageable with and releasable from the first engaging member, the engaging device being in a first state in which the first engaging member engages the second engaging member to retain a raised posture of the seat back when the seat back is raised from the forwardly folded state to the predetermined raised state, the engaging device being in a second state in which the engagement of the first engaging member with the second engaging member is released so that the seat back changes to the forwardly folded state by the force of the forwardly biasing member when the seat back is to be folded forwardly;

an electric motor configured to turn the seat back around the part in the vicinity of the rear end of the seat cushion; and a drive circuit configured to activate the electric motor, wherein the drive circuit includes:

a manipulation switch that is arranged at a predetermined part of a vehicle apart from the vehicle seat, and that activates, when manipulated to be in an ON state, the electric motor so that the seat back is raised from the forwardly folded state; and a compulsory cutting mechanism cutting, when the seat back is raised from the forwardly folded state to the predetermined raised state by manipulation of turning the manipulation switch to the ON state, electric conduction by the drive circuit to the electric motor so that the seat back is stopped in the predetermined raised state, wherein the compulsory cutting mechanism includes an interlocking switch that works with operation of the engaging device, and wherein the interlocking switch is in an ON state, for allowing the electric conduction by the drive circuit to the electric motor, when the engaging device is in the second state, thereby causing the seat back to be the forwardly folded state, and is an OFF state, for cutting electric conduction by the drive circuit to the electric motor, when the seat back is raised from the forwardly folded state to the predetermined raised state and the engaging device is in the first state.

2. The device for the vehicle seat of claim 1, wherein the seat back is changeable to a backwardly reclined state where the seat back is reclined or falls more backward than that in the predetermined raised state.

3. The device for the vehicle seat of claim 1, wherein the engaging device includes:

an operation member which moves between an operation point where it is in contact with one of the first and second engaging members to allow the one engaging member to engage with the other engaging member and a release point where the engagement is released;

a biasing member for applying force to the operation member to allow the operation member to move to the operation point; and release manipulation member, which is provided apart from the operation member and is connected to the operation member through operation force transmission member for moving the operation member to the release point against the force of the biasing member so as to release the engagement of the first engaging member with the second engaging member, wherein when the operation member moves to the operation point, the interlocking switch is in an OFF state by the movement thereof, and the interlocking switch is in an ON state when the operation member moves to the releasing point.

4. The device for the vehicle seat of claim 3, wherein the first engaging member is provided coaxially with a turning center of the seat back so as to turn together with the seat back, the operation member is in contact with the second engaging member, and turning of the first engaging member together with the seat back selectively changes an engaging point of the second engaging member relative to the first engaging member to change a backward reclined angle of the seat back.

5. The device for the vehicle seat of claim 1, further comprising:

a manipulation member that releases the seat back retained by the engaging device for allowing the seat back to be in the forwardly folded state by the force of the forwardly biasing member, wherein the electric motor is provided at one of members of the seat cushion or the vehicle as a member and the seat back as a member for turning and raising the seat back with the part in the vicinity of the rear end of the seat cushion as the center by transmitting torque to the other member, and a transmission releasing mechanism is provided for inhibiting transmission of counter torque from the seat back to the electric motor while the seat back is folded from the predetermined raised state to be in the forwardly folded state.

6. The device for the vehicle seat of claim 5, further comprising:

a drive gear provided at the one member and rotated by an output shaft of the electric motor;

a driven gear provided rotatably and coaxially with a turning center of the seat back and meshing with the drive gear; and a clutch provided at the other member for inhibiting relative rotation of the driven gear with respect to the other member so that the seat back is raised by rotation of the drive gear by the electric motor, wherein the transmission releasing mechanism releases the driven gear from the clutch's rotation inhibition.

7. The device for the vehicle seat of claim 6, wherein the clutch includes an engaging gear which rotates integrally with the driven gear, a hooking member which engages with the engaging gear, and a biasing member for applying force in a direction where the hooking member engages with the engaging gear, and a plurality of engaging teeth for engaging with the hooking member so as to allow the hooking member to inhibit the relative rotation of the driven gear are formed in the engaging gear in a peripheral direction of the engaging gear at a pitch larger than a forwardly foldable angle range of the seat back from an angle at the predetermined raised state to an angle at the forwardly folded state where it is inclined and folded toward the seat cushion.

8. The device for the vehicle seat of claim 7, wherein cam face in contact with the hooking member is formed between engaging teeth adjacent to each other in the peripheral direction of the engaging gear, the cam face causing the relative rotation of the driven gear with respect to the other member upon receipt of force of the biasing member.

9. The device for the vehicle seat of claim 5, wherein the transmission releasing mechanism works with a releasing manipulation of the manipulation member for releasing the seat back retained by the engaging device so as not to transmit counter torque from the seat back to the electric motor.

10. The device for the vehicle seat of claim 5, wherein the seat cushion is connected to the seat back and is supported upwardly and downwardly movably to the vehicle so as to be lowered with forward folding of the seat back and so as to be raised with raising of the seat back.

11. The device for the vehicle seat of claim 1, further comprising:
a manipulation member for releasing the seat back retained by the engaging device,
wherein the electric motor is provided at one of members of the seat cushion or the vehicle as a member and the seat back as a member for turning and raising the seat back with the part in the vicinity of the rear end of the seat cushion as the center by transmitting torque to the other member until the seat back in the forwardly folded state is in the predetermined raised state.

12. The device for the vehicle seat of claim 11, wherein when the engaging device releases the seat back, the seat back becomes capable of being reclined or falling more backward than the predetermined raised state by being pushed against the force of the biasing member, and
the engaging device retains the seat back in a backwardly reclined state as well as the seat back in the predetermined raised state.

13. The device for the vehicle seat of claim 12, wherein the forwardly folded state is a state where the seat back is laid over the seat cushion, and
the electric motor is set so that time required for changing the seat back from the forwardly folded state where it is laid over the seat cushion to the predetermined raised state is within seven seconds.

14. The device for the vehicle seat of claim 11, wherein the forwardly folded state is a state where the seat back is laid over the seat cushion, and
the biasing member and the electric motor are set so that time required for changing the seat back from the predetermined raised state to the forwardly folded state where it is laid over the seat cushion is shorter than time required for changing the seat back from the forwardly folded state where it is laid over the seat cushion to the predetermined raised state.

15. The device for the vehicle seat of claim 1,
wherein the electric motor is provided at one of members of the seat cushion or the vehicle as a member and the seat back as a member for raising the seat back in the forwardly folded state to the predetermined raised state by transmitting torque to the other member, and
when the retention mechanism releases the seat back in the predetermined raised state retained by the engaging device, the seat back becomes capable of being reclined or falling more backward than the predetermined raised state against the force of the biasing member.

16. The device for vehicle seat of claim 15, further comprising:
a transmission control mechanism for controlling transmission of torque of the electric motor to the other member when the seat back is in the backwardly reclined state.

17. The device for the vehicle seat of claim 5, wherein the transmission releasing mechanism substantially eliminates rotation of an output shaft of the electric motor.

18. A device for a vehicle seat that includes a seat cushion and a seat back that turns around a part in the vicinity of a rear end of the seat cushion so as to be changeable among a predetermined raised state, a forwardly folded state in which the seat back is inclined and folded toward the seat cushion or is laid over the seat cushion, and a backwardly reclined state in which the seat back is reclined or falls further backward than the predetermined raised state, and that is arranged adjacently to and on a vehicle front side of a luggage compartment, comprising:

a biasing member configured to apply a force to turn the seat back in a direction in which the seat back changes to the forwardly folded state;
a retention mechanism configured to retain the seat back in the predetermined raised state;
a manipulation member that releases the seat back retained by the retention mechanism for allowing the seat back to be in the forwardly folded state by the force of the biasing member;
an electric motor provided at one of members of the seat cushion or the vehicle as a member and the seat back as a member for turning and raising the seat back with the part in the vicinity of the rear end of the seat cushion as the center by transmitting torque to the other member;
a drive gear provided at the one member and rotated by an output shaft of the electric motor;
a driven gear provided rotatably and coaxially with a turning center of the seat back and meshing with the drive gear;
a clutch provided at the other member for inhibiting relative rotation of the driven gear with respect to the other member so that the seat back is raised by rotation of the drive gear by the electric motor;
a transmission releasing mechanism inhibiting transmission of counter torque from the seat back to the electric motor when the seat back is folded to be in the forwardly folded state by releasing the driven gear from the rotation inhibition of the clutch; and
a drive circuit configured to activate the electric motor,
wherein the drive circuit includes:
a momentary type manipulation switch that is arranged at a predetermined part of a vehicle apart from the vehicle seat, which is set in an OFF state normally, and that activates, when manipulated to be in an ON state, the electric motor so that the seat back is raised from the forwardly folded state; and
a compulsory cutting mechanism cutting, when the seat back is raised to the predetermined raised state by manipulation of turning the manipulation switch to the ON state, electric conduction by the drive circuit to the electric motor so that the seat back is stopped in the predetermined raised state regardless of whether the manipulation of turning the manipulation switch to the ON state is continued, and
wherein the clutch includes an engaging gear that rotates integrally with the driven gear, a hooking member that engages with the engaging gear, and a biasing member applying a force in a direction in which the hooking member engages with the engaging gear, and
a plurality of engaging teeth, for engaging the hooking member so as to allow the hooking member to inhibit the relative rotation of the driven gear, are formed in the engaging gear in a peripheral direction of the engaging gear at a pitch larger than a forwardly foldable angle range of the seat back from an angle at the predetermined raised state to an angle at the forwardly folded state in which it is inclined and folded toward the seat cushion.

19. The device for the vehicle seat of claim 18, wherein a cam face in contact with the hooking member is formed between engaging teeth adjacent to each other in the peripheral direction of the engaging gear, the cam face causing the relative rotation of the driven gear with respect to the other member upon receipt of force of the biasing member.

* * * * *